US009993884B2

(12) United States Patent
Fang et al.

(10) Patent No.: US 9,993,884 B2
(45) Date of Patent: Jun. 12, 2018

(54) DOUBLE-SIDED TANGENTIAL CUTTING INSERT

(71) Applicant: Kennametal Inc., Latrobe, PA (US)

(72) Inventors: Xiangdong Daniel Fang, Greensburg, PA (US); Michael R. Cripps, Murfreesboro, TN (US); Jean-Luc Daniel Dufour, Greensburg, PA (US); David J. Wills, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days. days.

(21) Appl. No.: 15/475,731

(22) Filed: Mar. 31, 2017

(65) Prior Publication Data

US 2017/0297120 A1  Oct. 19, 2017

Related U.S. Application Data

(63) Continuation-in-part of application No. 14/801,181, filed on Jul. 16, 2015.

(51) Int. Cl.
*B23B 27/14* (2006.01)
*B23B 27/16* (2006.01)
(Continued)

(52) U.S. Cl.
CPC .......... *B23C 5/2247* (2013.01); *B23C 5/1072* (2013.01); *B23C 2200/0433* (2013.01); *B23C 2200/0472* (2013.01); *B23C 2200/203* (2013.01); *B23C 2200/367* (2013.01); *B23C 2210/287* (2013.01)

(58) Field of Classification Search
CPC .......... B23C 5/2247; B23C 2200/0433; B23C 2200/203; B23C 2200/367; B23C 2200/208; B23C 5/2221; B23C 2200/36
See application file for complete search history.

(56) References Cited

U.S. PATENT DOCUMENTS 6,196,770 B1 * 3/2001 Astrom ................... B23C 5/109
407/114
7,905,687 B2 * 3/2011 Dufour ..................... B23C 5/06
407/113

(Continued)

FOREIGN PATENT DOCUMENTS

JP      2006082168 A  *  3/2006
JP      2014000666 A  *  1/2014  ............... B23C 5/06
JP      2016172294 A  *  9/2016  ............... B23C 5/20

*Primary Examiner* — Sara Addisu
(74) *Attorney, Agent, or Firm* — Ian K. Samways

(57) ABSTRACT

A double-sided tangential cutting insert comprising a pair of cutting rake faces, a pair of major side surfaces and a pair of opposing minor side faces each having a twisted convex shape. Each of the cutting rake faces is defined between a pair of main cutting edges, a pair of full nose cutting edges, and a pair of opposing convex minor cutting edges. Each of the minor side faces is defined between one of the convex minor cutting edges at one of the rake faces and one of the convex minor cutting edges at the other one of the rake faces wherein, at each minor side face, a ridge line interconnects an apex of the convex minor edge at the one of the rake faces and an apex of the convex minor cutting edge at the other one of the rake faces. Other variants and embodiments are broadly contemplated herein.

19 Claims, 21 Drawing Sheets

(51) Int. Cl.
*B23C 5/02* (2006.01)
*B23C 5/22* (2006.01)
*B23C 5/10* (2006.01)

(56) References Cited

U.S. PATENT DOCUMENTS

| | | | | |
|---|---|---|---|---|
| 7,905,688 B2* | 3/2011 | Ertl | ............ | B23C 5/10 407/113 |
| 8,277,153 B2* | 10/2012 | Kovac | ............ | B23C 5/06 407/103 |
| 8,449,230 B2* | 5/2013 | Nguyen | ............ | B23C 5/109 407/113 |
| 8,702,353 B2* | 4/2014 | Chen | ............ | B23C 5/06 407/113 |
| 8,753,045 B2* | 6/2014 | Hecht | ............ | B23B 27/1622 407/113 |
| 8,961,076 B2* | 2/2015 | Ishi | ............ | B23C 5/06 407/113 |
| 8,979,440 B2* | 3/2015 | Ishi | ............ | B23C 5/109 407/113 |
| D748,703 S * | 2/2016 | Nam | ............ | D15/139 |
| D777,230 S * | 1/2017 | Fang | ............ | D15/139 |
| 2003/0170080 A1* | 9/2003 | Hecht | ............ | B23B 27/08 407/113 |
| 2004/0208713 A1* | 10/2004 | Duerr | ............ | B23C 5/2221 407/34 |
| 2005/0042044 A1* | 2/2005 | Satran | ............ | B23C 5/2213 407/113 |
| 2005/0063792 A1* | 3/2005 | Satran | ............ | B23C 5/1072 407/113 |
| 2007/0059111 A1* | 3/2007 | Deitert | ............ | B23C 5/207 407/113 |
| 2009/0311057 A1* | 12/2009 | Yoshida | ............ | B23C 5/109 407/113 |
| 2010/0202839 A1* | 8/2010 | Fang | ............ | B23C 5/109 407/53 |
| 2012/0070242 A1* | 3/2012 | Choi | ............ | B23C 5/109 407/113 |
| 2012/0093596 A1* | 4/2012 | Ishi | ............ | B23C 5/06 407/113 |
| 2013/0115022 A1* | 5/2013 | Ishi | ............ | B23C 5/109 409/132 |
| 2014/0064864 A1* | 3/2014 | Kaufmann | ............ | B23B 27/141 407/114 |
| 2014/0298967 A1* | 10/2014 | Ishi | ............ | B23C 5/109 83/13 |
| 2014/0341660 A1* | 11/2014 | Cheon | ............ | B23C 5/06 407/42 |
| 2015/0117969 A1* | 4/2015 | Brunetto | ............ | B23C 5/207 407/42 |
| 2015/0139744 A1* | 5/2015 | Harif | ............ | B23B 51/02 407/69 |
| 2017/0014920 A1* | 1/2017 | Fang | ............ | B23C 5/08 |
| 2017/0157685 A1* | 6/2017 | Mao | ............ | B23C 5/2213 |

* cited by examiner

DETAIL J

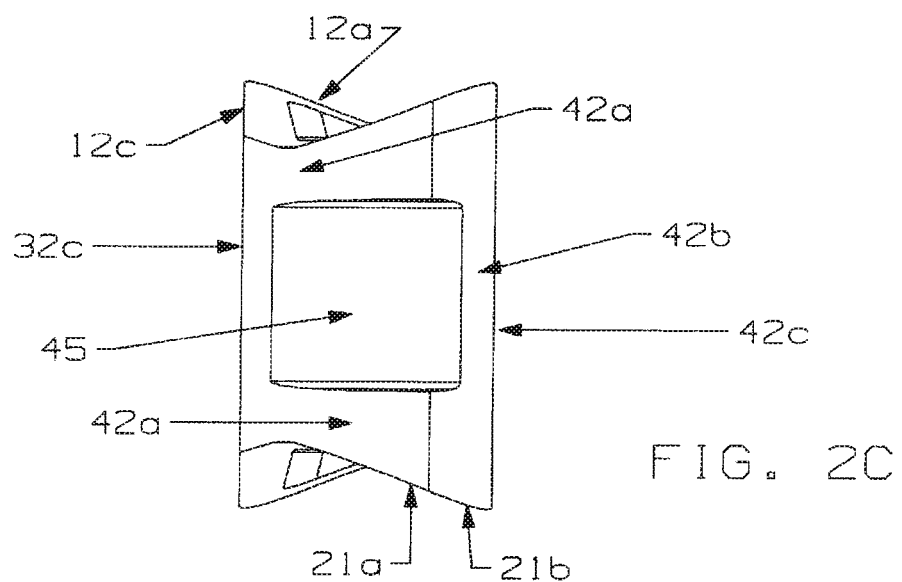

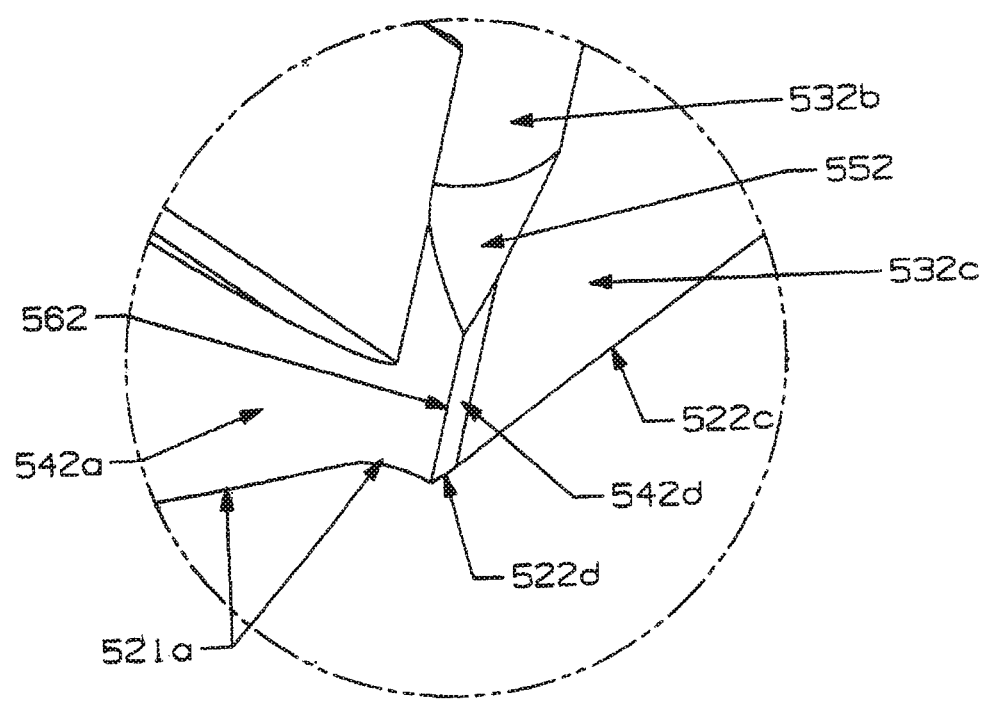
DETAIL L FIG. 9A

DOUBLE-SIDED TANGENTIAL CUTTING INSERT

CROSS-REFERENCE TO RELATED APPLICATION

This patent application claims priority under 35 USC § 120 as a continuation-in-part of co-pending U.S. patent application Ser. No. 14/801,181, filed on Jul. 16, 2015, which is incorporated herein by reference in its entirety.

BACKGROUND

The present disclosure is directed to an indexable double-sided tangential cutting insert and a cutting tool system, which use such double-sided tangential cutting inserts, for a variety of rotary milling applications. In one non-limiting specific embodiment, indexable double-sided tangential cutting inserts according to the present invention are particularly useful in peripheral rotary milling applications for machining difficult-to-machine materials. In another non-limiting specific embodiment, indexable double-sided tangential cutting inserts according to the present invention are uniquely useful in peripheral rotary milling applications that generate segmented chips, for instance, when machining cast-iron and alloys or medium to high carbon steels.

A double-sided tangential milling cutting insert is generally defined as the cutting rake faces where the chip groove/chip breaker does not have a through fastener hole, or in other words, the through fastener hole is located between two cutting rake faces, but in a laterally-crossed orientation. For a double-sided tangential cutting insert, all cutting rake faces with built-in chip groove geometry must have an abutment face to support the tangential cutting force during the machining.

Efforts in the industry to develop new or improved double-sided tangential cutting inserts have been directed toward achieving reduced cutting forces, reduced power consumption, increased cutting edge strength, and increased tool life. Representative patent documents include U.S. Pat. No. 6,872,034, U.S. Pat. No. 7,063,489, U.S. Pat. No. 7,094,007, and U.S. Pat. No. 7,104,735 wherein these documents have disclosed double-sided tangential cutting inserts with two basic shapes in major side surfaces (trapezoidal and parallelogram) and varying abutment surfaces on the cutting rake surface. From the point view of geometrical design, the above-mentioned patents disclose a generally rectangular shape peripherally enclosed by the two planar major side faces, two planar minor side faces and together with four nose faces as viewed normally to the cutting rake surface of the double-sided tangential cutting insert, or in other words, the main cutting edge is perpendicular to the minor cutting edge. The drawbacks with the kinds of cutting inserts disclosed in these patents include a difficulty to effectively balance on the required surface finish and the perpendicularity between the machined surface and machined wall on the workpiece which occurs, for example, in a slot milling, largely due to the complex cutting edge geometry in particular on the minor cutting edges formed between the cutting rake face and the minor side face.

The present invention aims at developing an improved double-sided tangential cutting insert, as well as a cutting tool system using the improved double-sided tangential cutting insert, to address the above-mentioned issues.

SUMMARY

The present invention provides an innovative and unique concept for indexable double-sided tangential cutting inserts. The double-sided tangential cutting insert of the present invention has a unique peripheral shape mainly enclosed by the two planar major side faces and two convex minor side faces as viewed normally from flat abutment faces on a cutting rake surface. The double-sided tangential cutting insert of the present invention has two major cutting edges formed between a cutting rake surface and two planar major side faces. The double-sided tangential cutting insert further has two convex minor cutting edges each having a large convex radius formed between a cutting rake surface and two convex minor side faces each having generally arcuate or conical surface.

The two identical opposing cutting rake surfaces of the double-sided tangential cutting insert of the present invention have a unique peripheral profile comprising mainly a pair of identical opposing substantially straight cutting edges, a pair of opposing arcuate cutting edges with a regular radius and a pair of opposing convex minor cutting edges with a much larger radius (as viewed from a direction normal to the cutting rake surface). One advantage of a convex minor cutting edge with a much larger radius associated with a convex minor side face is to guarantee the surface finish of machined surface as well as the perpendicularity between the machined surface and machined wall on the workpiece under some heavy cutting conditions. Another advantage of a convex minor cutting edge having a large radius is that the large curvature radius, as compared with a straight minor cutting edge perpendicular to a straight main cutting edge, can adapt to some undesirable machining processes such as, for example, tool holder deflections during machining and tolerance variations from product manufacturing.

According to one non-limiting aspect of the present invention, each indexable cutting edge of the double-sided tangential cutting insert, as viewed from the normal direction of the flat abutment faces on a cutting rake surface, comprises at least a convex minor cutting edge having a large radius, a single full nose cutting edge and a main cutting edge truncated by the adjacent convex minor side face.

According to another non-limiting aspect of the present invention, each indexable cutting edge of the double-sided tangential cutting insert comprises, as viewed from the normal direction of the flat abutment faces on a cutting rake surface, a convex minor cutting edge having a large radius, a single full nose cutting edge, a main cutting edge, and a partial nose cutting edge having a small and fixed radius no larger than about 0.25 mm and truncated by the adjacent convex minor side face.

Further, according to another non-limiting aspect of the present invention, each indexable cutting edge of the double-sided tangential cutting insert, as viewed from the normal direction of the flat abutment faces on a cutting rake surface, comprises a convex minor cutting edge having a large radius, a single full nose cutting edge, a main cutting edge comprising a straight main cutting edge portion and a convex main cutting edge portion truncated by the adjacent convex minor side face.

Further, according to still another non-limiting aspect of the present invention, a cutting tool system comprising a tool holder; at least one insert-receiving pocket on the tool holder; and at least one double-sided tangential cutting insert according to present invention wherein the insert-receiving pocket is built-in around the periphery of the tool holder and comprises a bottom seating face with a threaded hole, an axial seating face, and a peripheral seating face abutting a pair of flat abutment faces on the cutting rake surface of a double-sided tangential cutting insert.

Also broadly contemplated herein is a variant embodiment of a double-sided tangential cutting insert, in which smoother cutting action, an increased effective cutting length, and a simplified cutting insert manufacturing process are facilitated. According to a non-limiting aspect, a double-sided tangential cutting insert has a generally barrel-shaped periphery as viewed from the normal direction of a cutting rake face, a generally parallelogram-shaped profile as viewed from the normal direction of a major side surface, and a twisted convex minor side face formed by the two convex minor cutting edges at the top and bottom cutting rake faces. A double-sided tangential cutting insert, as broadly contemplated herein, can thereby include a convex minor cutting edge having a large radius, a single full nose cutting edge, and a straight main cutting edge truncated by an adjacent twisted convex minor side face.

BRIEF DESCRIPTION OF THE DRAWINGS

Various features and characteristics of non-limiting specific embodiments according to the present invention will be better understood by reference to the following drawings, in which:

FIG. 2C is a projected view on the minor side surface on the right side of the double-sided tangential cutting insert of FIG. 1;

FIG. 4A is an enlarged view identified as DETAIL D that corresponds to the structure in the circle identified as D in FIG. 4;

FIG. 9A is an enlarged view identified as DETAIL L that corresponds to the structure in the circle identified as L in FIG. 9;

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

In the present description of non-limiting specific embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Double-sided tangential cutting inserts are typically used in peripheral rotary milling and slot milling due to their relatively larger depth of cut obtained by the relatively longer cutting edge.

Figure 1:
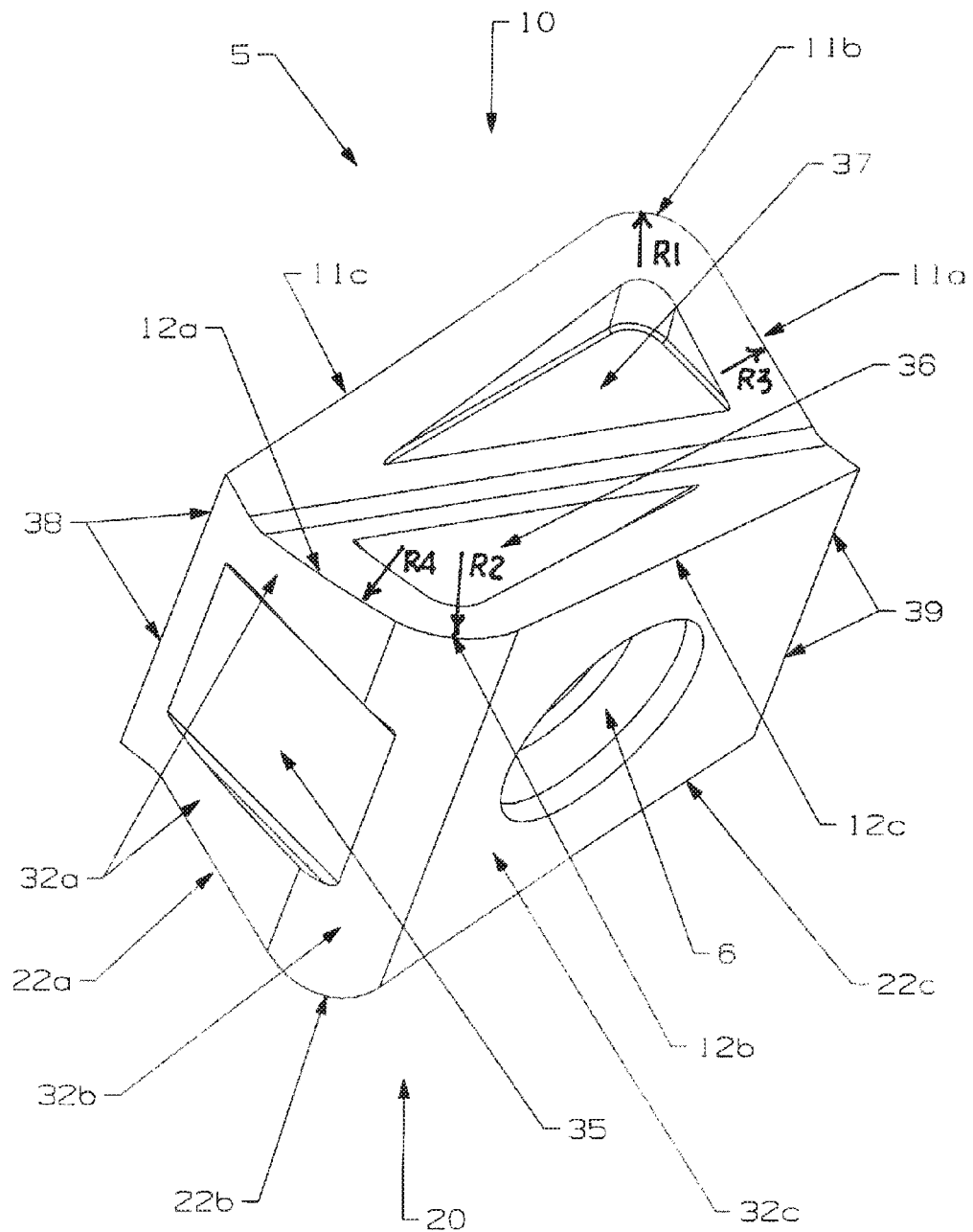
FIG. 1 is a specific embodiment of a trapezoidal double-sided tangential cutting insert with each indexable cutting edge comprising a convex minor cutting edge having a large radius, a single full nose cutting edge, a main cutting edge truncated by the adjacent convex minor side face according to present invention.
Figure 2A:
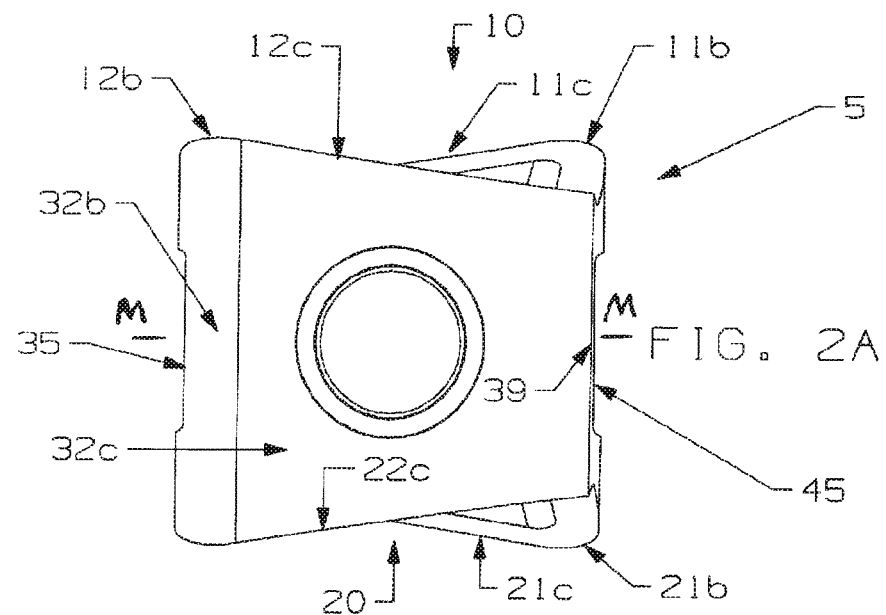
FIG. 2A is a projected view on the major side surface of the double-sided tangential cutting insert of FIG. 1.
Figure 2B:
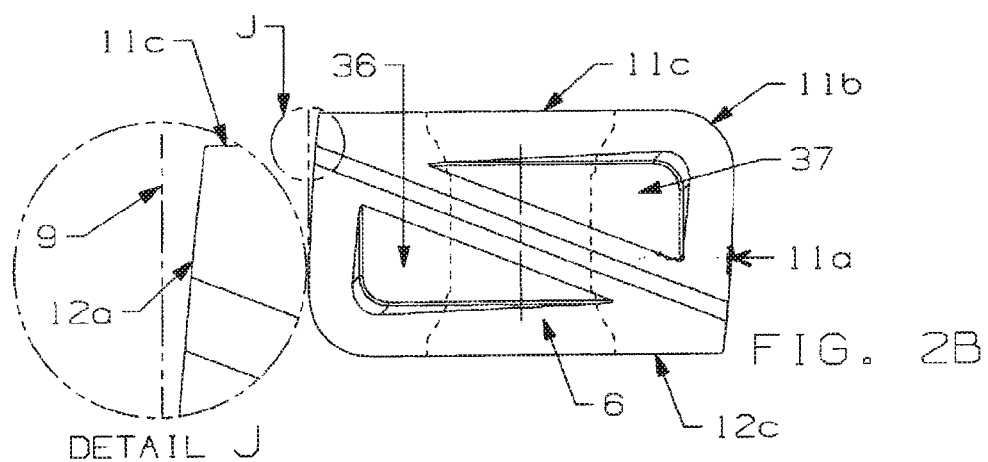
FIG. 2B is a projected view on the cutting rake surface of the double-sided tangential cutting insert of FIG. 1 and includes DETAIL J.

FIG. 1 and FIGS. 2A-2C show an embodiment of a trapezoidal double-sided tangential cutting insert 5 wherein FIG. 1 is a three-dimensional perspective view, FIG. 2A is a projected view on the major (planar) side surface 32c having a trapezoidal shape, FIG. 2B is a projected view on the cutting rake surface 10 together with a detailed view J, and FIG. 2C is a projected view as viewed from the right side of FIG. 2A.

The double-sided tangential cutting insert 5 with a through fastener hole 6 has a top cutting rake surface 10 and an identical (or substantially identical) bottom cutting rake surface 20 (partially visible) wherein the bottom cutting rake surface 20 has a mirror relationship with the top cutting rake surface 10 via a median plane m-m through the center of the hole 6. The top cutting rake surface 10 has a peripheral shape comprising a pair of identical opposing substantially straight cutting edges 11c and 12c, a pair of opposing nose cutting edges 11b and 12b having a radius of R1 and R2, respectively, typically ranging in size from about 0.4 mm to about 8.0 mm, and a pair of opposing convex minor cutting edges 11a and 12a having a radius of R3 and R4, respectively. For each of the convex minor cutting edges (11a, 12a) the radius R3 and R4 are at least four times larger than the range of the corresponding radius (R1 and R2) of the nose cutting edges 11b and 12b. In other words, the minor cutting edge radius R3 is at least about four times as great as the nose cutting radius R1, and R4 is at least about four times as great as R2.

A representative indexable cutting edge on the top cutting rake surface 10 comprises a convex minor cutting edge 11a having a large radius R3, a single full nose cutting edge 11b, a main cutting edge 11c truncated by the adjacent convex minor side face 32a. A full nose cutting edge 11b is defined as the nose cutting edge being tangent to both adjacent cutting edges (11a and 11c). A sharp edge 38 is formed as a result that the main cutting edge 11c is truncated by the adjacent convex minor side face 32a.

Similarly, another indexable cutting edge on the top cutting rake surface 10 comprises a convex minor cutting edge 12a having a large radius (R4), a single and full nose cutting edge 12b, and a major cutting edge 12c truncated by the adjacent convex minor side face 42a (see FIG. 2C). The Detail View J in FIG. 2B illustrates that the convex minor cutting edge 12a turns away in the form (or path) of an arc from the virtual reference line 9 which is perpendicular to both the main cutting edges 11c and 12c. One advantage of the convex minor cutting edge 12a is to guarantee (or improve the production of an acceptable) surface finish of the machined surface when operating under undesirable machining conditions such as, for example, tool holder deflections during machining and tolerance variations from product manufacturing. A sharp edge 39 is also formed as a result that the main cutting edge 12c (or equivalently the major side face 32c) is truncated by the adjacent convex minor side face 42a. On the bottom cutting rake face 20 of the cutting insert 5 there are two indexable cutting edges 22a, 22b and 22c (FIG. 1), and 21a, 21b and 21c (FIG. 2A and FIG. 2C), respectively.

In reality of cutting insert manufacturing like in a carbide pressing process, the sharp edges 38 and 39 may be blended with a small radius (typically about 0.25 mm or smaller) which is much smaller than a regular nose radius (R1 and R2) (ranging from about 0.4 to about 8 mm). Thus, the sharp edges (38, 39) may, in actuality, be generally sharp edges due to the above small radius wherein the generally sharp edges are at the abrupt termination of the adjacent surfaces (or faces). This description of the sharp edges applies to the other references to sharp edges in this application.

Further, as illustrated in FIG. 2C, the peripheral side surface of the cutting insert 5 extending from the top cutting rake surface 10 to the bottom cutting rake surface 20 comprises a pair of identical (or substantially identical) opposing planar major side faces 32c and 42c functioning as seating faces, a pair of opposing identical (or substantially identical) arcuate side faces 32b and 42b, and a pair of opposing identical (or substantially identical) convex minor side faces 32a and 42a. The cutting insert 5 has a pair of identical (or substantially identical) distinct peripheral support surfaces 36 and 37, which have a generally triangular shape when viewed in a direction perpendicular to the cutting rake surface, on a top cutting rake face 10 wherein the surfaces 36 and 37 are generally co-planar and generally perpendicular to a major side face 32c or 42c. The stability of the support is thought to be enhanced (or increased) due to the fact that the peripheral support surfaces are spaced-apart (or separated or distinct) from each other. The double-sided tangential cutting insert 5 also has two identical axial support faces 35 (FIG. 1) and 45 (FIG. 2C) wherein the convex minor side face 32a is partially truncated by the face 35, and the convex minor side face 42a is partially truncated by the face 45. The cutting insert 5 is referred as a trapezoidal double-sided tangential cutting insert as the main cutting edge 12c at the top face 10 is not parallel to the main cutting edge 22c at the bottom face 20 as shown in FIG. 2A.

Figure 3:
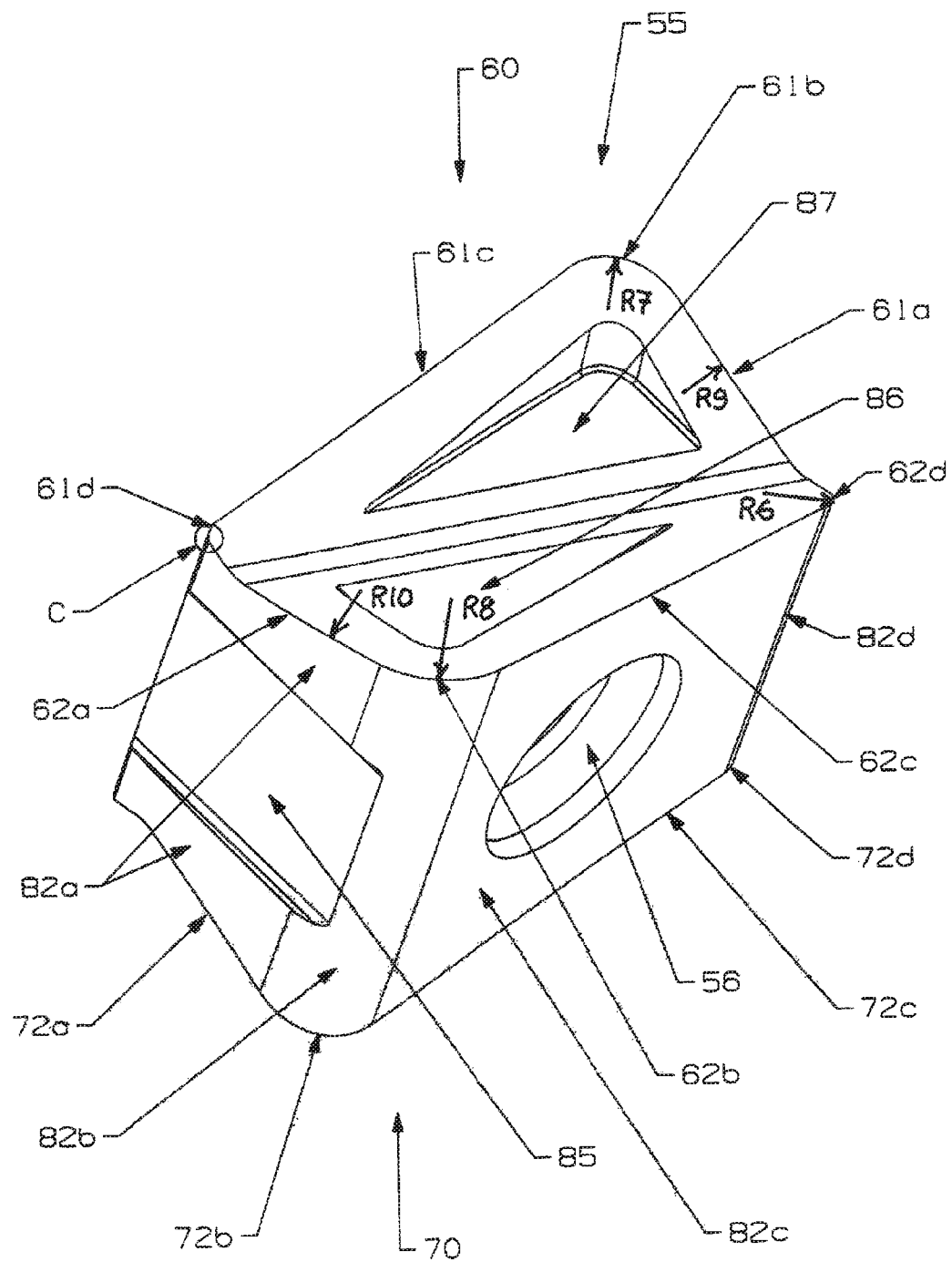
FIG. 3 is a three-dimensional perspective view of another specific embodiment of a trapezoidal double-sided tangential cutting insert with each indexable cutting edge comprising a convex minor cutting edge having a large radius, a single full nose cutting edge, a main cutting edge, and a partial nose cutting edge having a smaller and fixed radius (generally, but not limited to be equal to no larger than about 0.25 mm) and being truncated by the adjacent convex minor side face according to present invention.
Figure 3A:
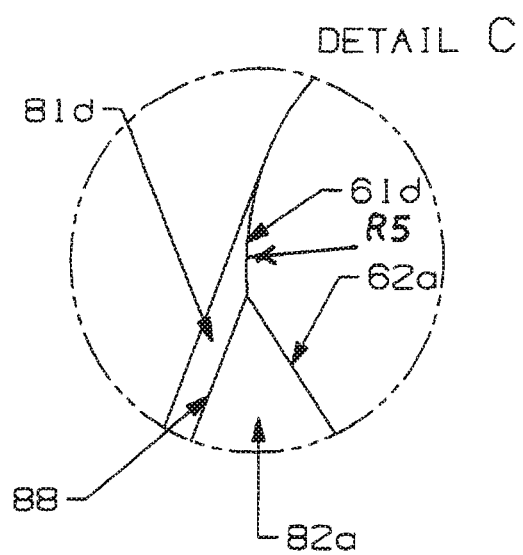
FIG. 3A is an enlarged view identified as DETAIL C that corresponds to the structure in the circle designated as C in FIG. 3.

FIG. 3 is a perspective three-dimensional view together with a detail view C (see FIG. 3A) of another specific embodiment of a trapezoidal double-sided tangential cutting insert 55 according to present invention. FIG. 3A is a detail view DETAIL C that shows the structure in circle identified as C in FIG. 3.

The double-sided tangential cutting insert 55 with a through fastener hole 56 has a top cutting rake surface 60 and an identical (or substantially identical) bottom cutting rake surface 70. The top cutting rake surface 60 has a peripheral cutting edge comprising mainly a pair of identical (or substantially identical) opposing partial nose cutting edge 61d (radius R5) and 62d (radius R6) having a small and fixed radius (typically no larger than about 0.25 mm), a pair of identical (or substantially identical) opposing substantially straight cutting edges 61c and 62c, a pair of opposing full nose cutting edges 61b and 62b having a radius of R7 and R8, respectively, typically ranging from about 0.4 mm to about 8.0 mm, and a pair of opposing convex minor cutting edges 61a and 62a having a radius of R9 and R10, respectively. For each of the convex minor cutting edges (61a, 62a), the radius R9 and R10 are at least four (4) times greater than the range of the corresponding full nose cutting edges 61b and 62b. In other words, R9 is at least about four times as great as R7, and R10 is at least about four times as great as R8. As is apparent, the radii R5 and R6 of the partial nose cutting edges (61d, 62d) are smaller than the radii R7 or R8 of the full nose cutting edges (61b, 62b) and the radii R5 and R6 of the partial nose cutting edges (61d, 62d) are smaller than the radii R9 and R10 of the convex minor cutting edges (61a, 62a).

A representative indexable cutting edge on the top cutting rake surface 60 comprises a convex minor cutting edge 61a having a very large radius (R9), a single full nose cutting edge 61b (radius R5), a straight main cutting edge 61c, and a partial nose cutting edge 61d (radius R5) truncated by the adjacent convex minor side face 82a. A sharp edge 88 is formed as a result that the partial nose cutting edge 61d is truncated by the adjacent convex minor side face 82a. A representative indexable cutting edge on the bottom cutting rake surface 70 comprises a convex minor cutting edge 72a having a large radius, a full nose cutting edge 72b, a main cutting edge 72c, and a partial and truncated nose cutting edge 72d. The radius of each of the convex minor cutting edge 72A, the full nose cutting edge 72b, and the partial and truncated nose cutting edge 72d is along the lines of the corresponding radius of each of the convex minor cutting edge 62A, the full nose cutting edge 62b, and the partial and truncated nose cutting edge 62d.

Further, the peripheral side surface of the cutting insert 55 extending from the top cutting rake surface 60 to the bottom cutting rake surface 70 comprises a pair of opposing identical (or substantially identical) convex minor side faces (only 82a visible); a pair of opposing identical (or substantially identical) cylindrical (or arcuate) side faces (only 82b visible); a pair of opposing identical (or substantially identical) planar major side faces (only 82c visible); and a pair of opposing identical (or substantially identical) truncated cylindrical side faces 81d and 82d. The cutting insert 55 has a pair of identical (or substantially identical) distinct peripheral support surfaces 86 and 87 on a top cutting rake face 60 wherein the faces 86 and 87 are co-planar and perpendicular to a major side face 82c. The double-sided tangential cutting insert 55 also has two identical (or substantially identical) axial support faces (only 85 visible) wherein the convex minor side face 82a is truncated at the middle by the face 85.

Figure 4:
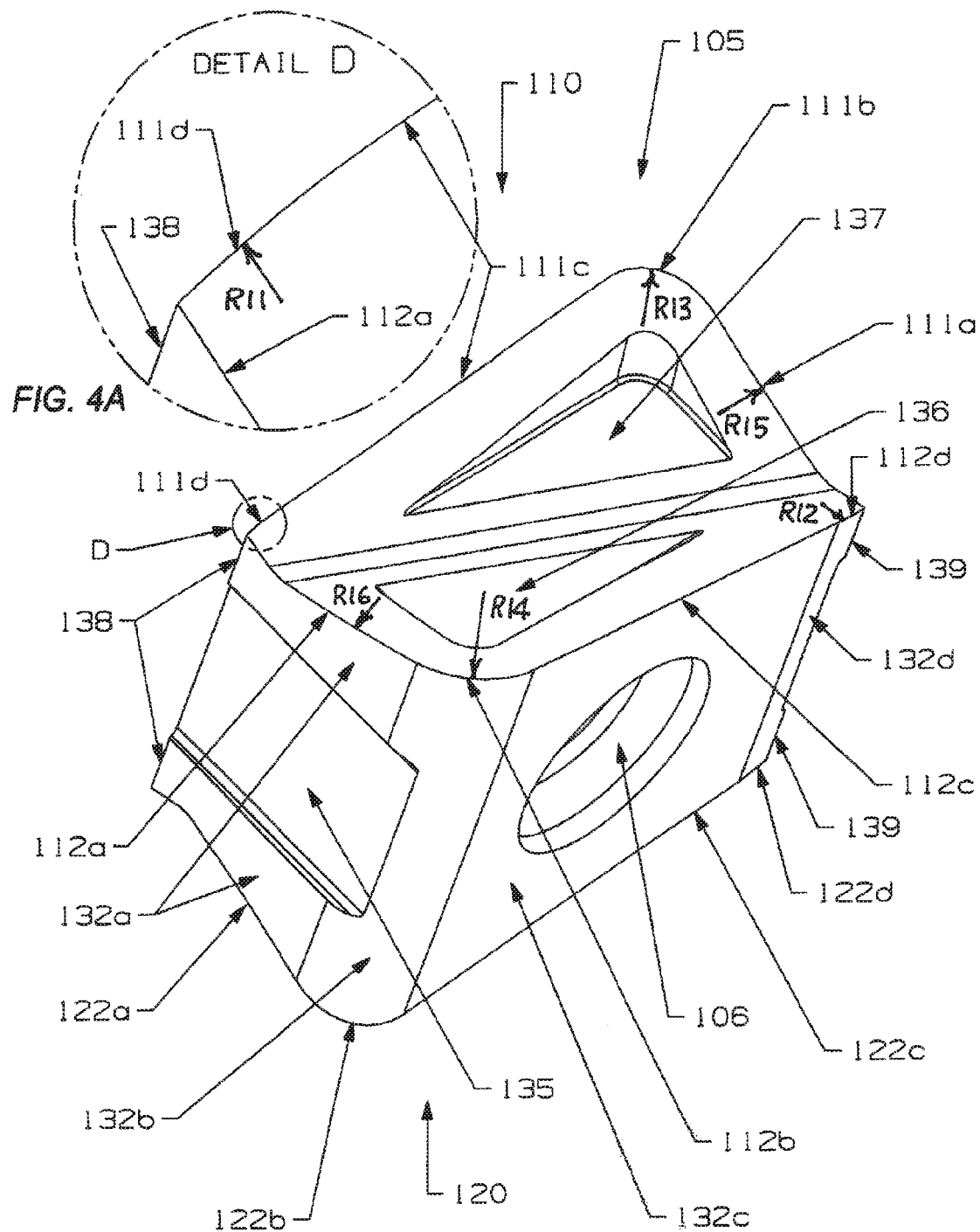
FIG. 4 is a three-dimensional perspective view of another specific embodiment of a trapezoidal double-sided tangential cutting insert with each indexable cutting edge comprising a convex minor cutting edge having a large radius, a single full nose cutting edge, a main cutting edge comprising a straight cutting edge portion and a convex cutting edge portion edge truncated by the adjacent convex minor side face according to present invention.

FIG. 4 is a perspective three-dimensional view of another specific embodiment of a trapezoidal double-sided tangential cutting insert 105 according to present invention disclosure. FIG. 4A is an enlarged view of the structure in the circle identified as D on FIG. 4.

The double-sided tangential cutting insert 105 with a through fastener hole 106 has a top cutting rake surface 110 and an identical (or substantially identical) bottom cutting rake surface 120. The cutting rake surface 110 has a peripheral cutting edge comprising mainly a pair of identical (or substantially identical) opposing main cutting edges each comprising a substantially straight cutting edge portion 111c (or 112c) and a convex cutting edge portion 111d (radius R11) (or 112d (radius R12)); a pair of opposing full nose cutting edges 111b (radius R13) and 112b (radius R14) having a radius ranging from about 0.4 mm to about 8.0 mm; and a pair of opposing convex minor cutting edges 111a (radius R15) and 112a (radius R16). For each of the convex minor cutting edges (111a, 112a), the radius R15 and R16 are at least about four times greater than the range of the corresponding full nose cutting edges 111b and 112b. In other words, R15 is at least about four times as great as R13, and R16 is at least about four times as great as R14.

A representative indexable cutting edge on the top cutting rake surface 110 comprises a convex minor cutting edge 111a having a large radius; a single full nose cutting edge 111b; a main cutting edge comprising a substantially straight main cutting edge portion 111c and a convex main cutting edge portion 111d which is truncated by the adjacent convex minor side face 132a. The convex main cutting edge portion 111d is tangent to the straight main cutting edge portion 111c at one end and truncated by the adjacent convex minor side face 132a at the other end. The function of the convex main cutting edge 111d is to eliminate the marks likely produced on the workpiece surface due to the deflection of a cutting tool system during the machining process.

A sharp edge 138 (similar for the sharp edge 139) is formed as a result that the convex cutting edge 111d is truncated by the adjacent convex minor side face 132a. A representative indexable cutting edge on the bottom cutting rake surface 120 comprises a convex minor cutting edge 122a having a large radius, a single full nose cutting edge 122b, a main cutting edge comprising a substantially straight main cutting edge portion 122c and a convex main cutting edge portion 122d. The convex main cutting edge portion 122d and the corresponding convex main side face 132d are truncated by the adjacent convex minor side face (invisible but the opposing face of 132a).

In reality of cutting insert manufacturing like in a carbide pressing process, the so-called sharp edges 138 and 139 may be blended with a small and fixed radius (typically about 0.25 mm or smaller) which is much smaller than a regular nose radius (ranging from about 0.4 to about 8 mm).

Further, the peripheral side surface of the cutting insert 105 extending from the top cutting rake surface 110 to the bottom cutting rake surface 120 comprises a pair of opposing identical (or substantially identical) convex minor side faces (only 132a visible); a pair of opposing identical (or substantially identical) cylindrical faces (only 132b visible); a pair of opposing identical (or substantially identical) planar major side faces (only 132c visible); and a pair of opposing identical (or substantially identical) truncated convex faces (only 132d visible). The cutting insert 105 has a pair of identical (or substantially identical) distinct peripheral support surfaces 136 and 137 on a top cutting rake face 110 wherein the faces 136 and 137 are co-planar and perpendicular to a major side face 132c. The double-sided tangential cutting insert 105 also has two identical (or substantially identical) axial support faces (only 135 visible) wherein the convex minor side face 132a is truncated by the face 135. The axial support face 135, the peripheral support surfaces 136 and 137, and the major side face 132c are perpendicular to each other.

Figure 5A:
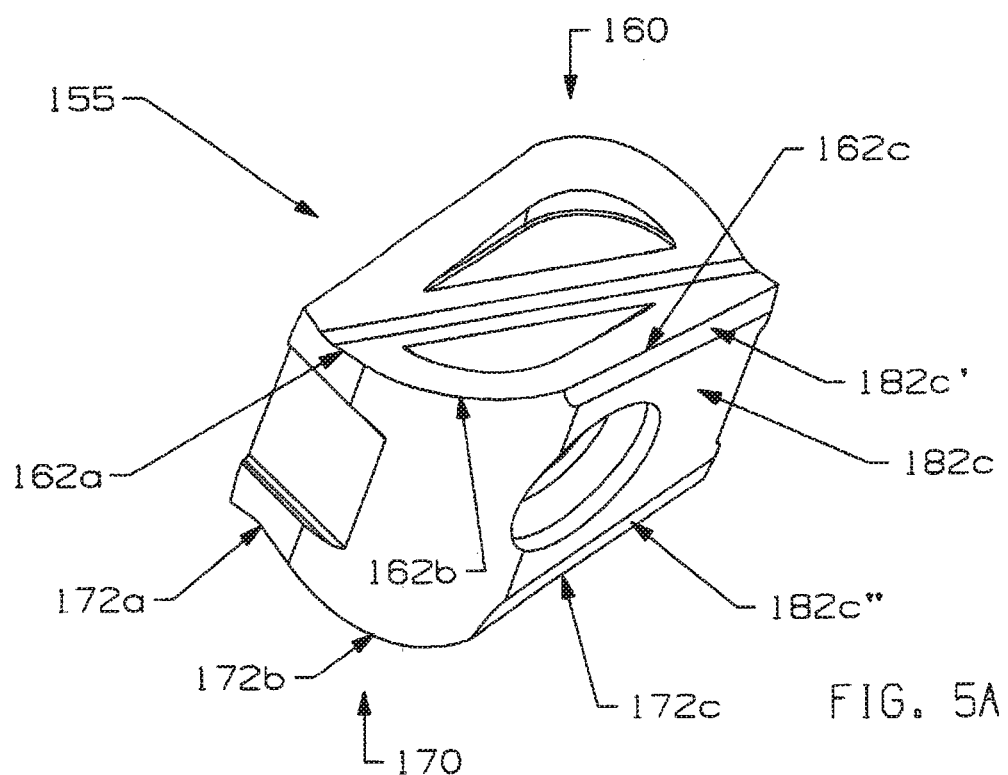
FIG. 5A is a three-dimensional perspective view of an additional specific embodiment of a trapezoidal double-sided tangential cutting insert.
Figure 5B:
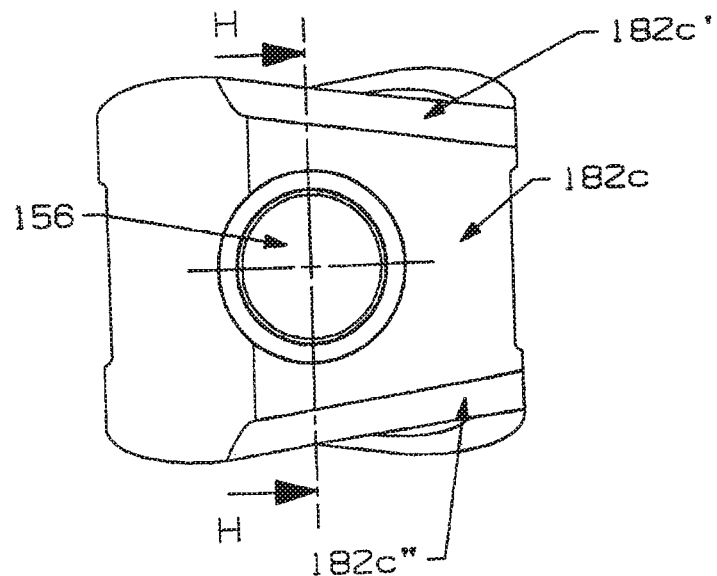
FIG. 5B is a projected view on the major side surface of the double-sided tangential cutting insert of FIG. 5A.
Figure 5C:
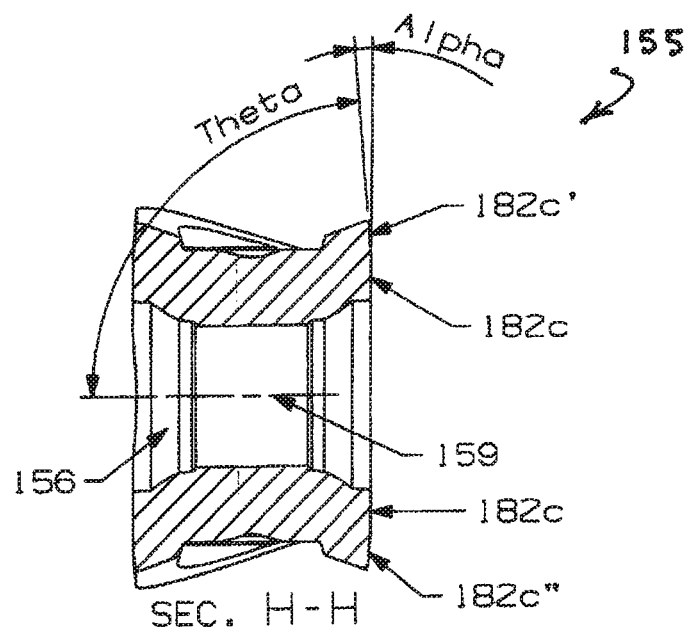
FIG. 5C is a sectional view of the double-sided tangential cutting insert of FIG. 5A.

FIGS. 5A through 5C illustrate an additional specific embodiment of a trapezoidal double-sided tangential cutting insert 155 with each indexable cutting edge being similar to that shown in FIG. 1, but having two major side surfaces trimmed at the two ends adjacent to each main cutting edges. FIG. 5A is a three-dimensional perspective view. FIG. 5B is a projected view on the major side surface. FIG. 5C a sectional view taken along section line H-H in FIG. 5B.

The double-sided tangential cutting insert 155 with a through fastener hole 156 and a center line 159 of the hole 156 has a top cutting rake surface 160 and an identical (or substantially identical) bottom cutting rake surface 170. Similar to that in FIG. 1, each indexable cutting edge on the top cutting rake surface 160 comprises a convex minor cutting edge 162a having a large radius so that it exhibits curvature, a single full nose cutting edge 162b, and a main cutting edge 162c truncated by the adjacent convex minor side face (not shown). Similarly, each indexable cutting edge on the bottom cutting rake surface 170 comprises a convex minor cutting edge 172a having a large radius, a single full nose cutting edge 172b, and a main cutting edge 172c truncated by the adjacent convex minor side face (not shown).

An additional feature added to the double-sided tangential cutting insert 155 is that each major side surface is trimmed at the two ends adjacent to the main cutting edges (162c and 172c). As shown in FIG. 5A, the major side surface 182c is trimmed forming a first secondary major side surface 182c' at the end close to the main cutting edge 162c and a second secondary major side surface 182c" at the end close to the main cutting edge 172c. These clearances help protect the integrity of the cutting edges. Referring to FIG. 5C, the trimming angle "Alpha" may have a negative value from the major side surface 182c if the angle "Theta" between the trimmed surface 182c' and the hole center line 159 is less than 90 degrees. Or the trimming angle "Alpha" may have a positive value from the major side surface 182c if the angle "Theta" between the trimmed surface 182c' and the hole center line 159 is larger than 90 degrees. The trimmed surface 182c" is identical (or substantially identical) to the trimmed surface 182c'.

Figure 6:
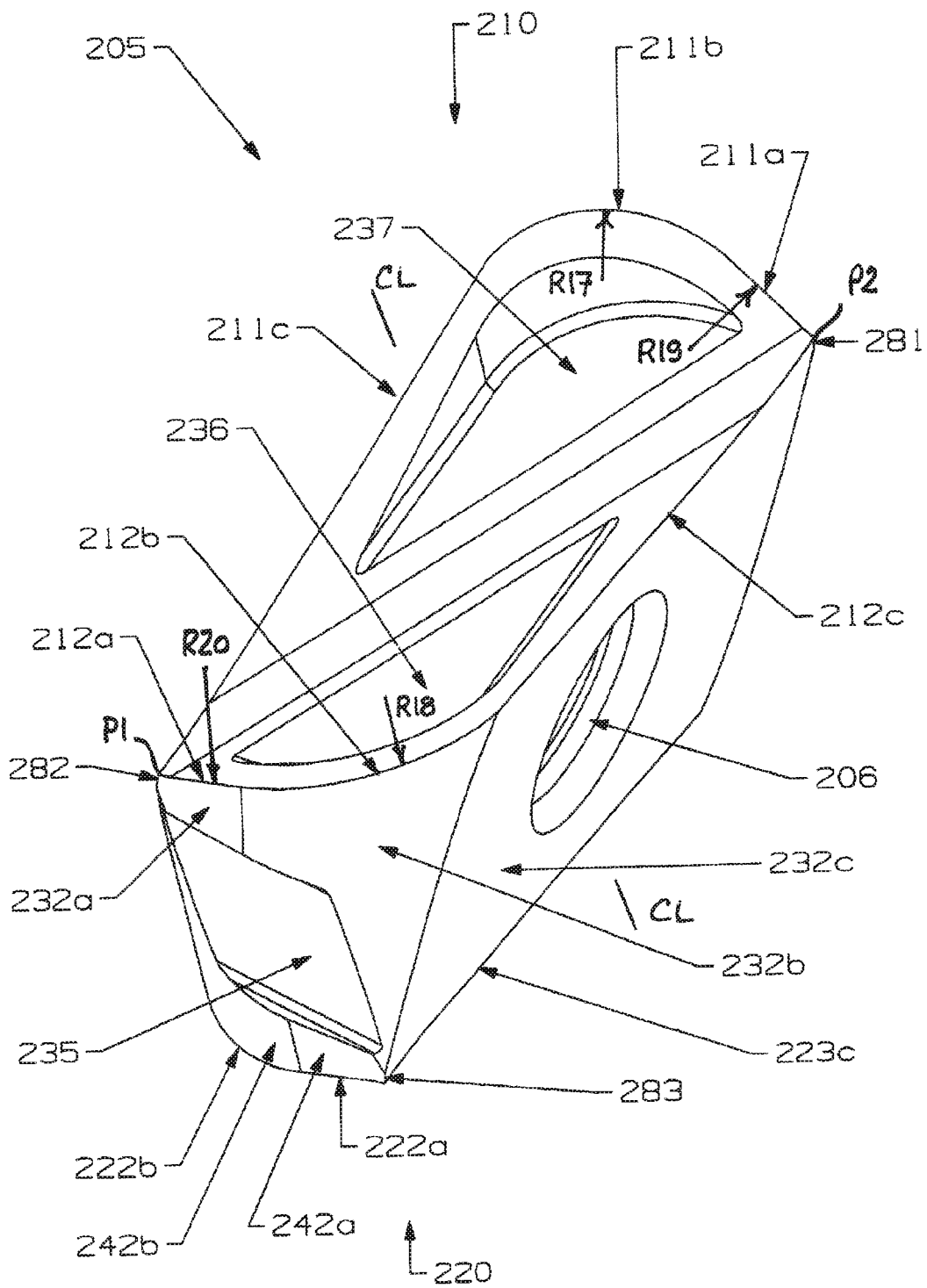
FIG. 6 is a three-dimensional perspective view of a specific embodiment of a parallelogram double-sided tangential cutting insert having parallelogram-shaped major side surfaces with each indexable cutting edge comprising a convex minor cutting edge having a large radius, a single full nose cutting edge, a main cutting edge truncated by the adjacent convex minor side face according to present invention.
Figure 7A:
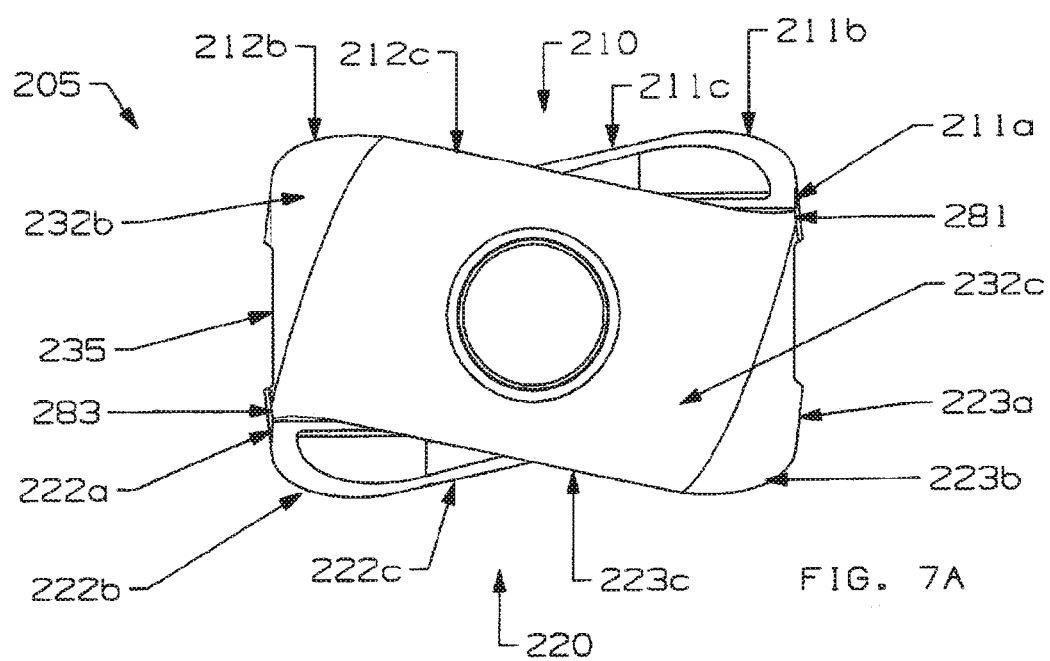
FIG. 7A is a projected view on the major side surface of the double-sided tangential cutting insert of FIG. 6.
Figure 7B:
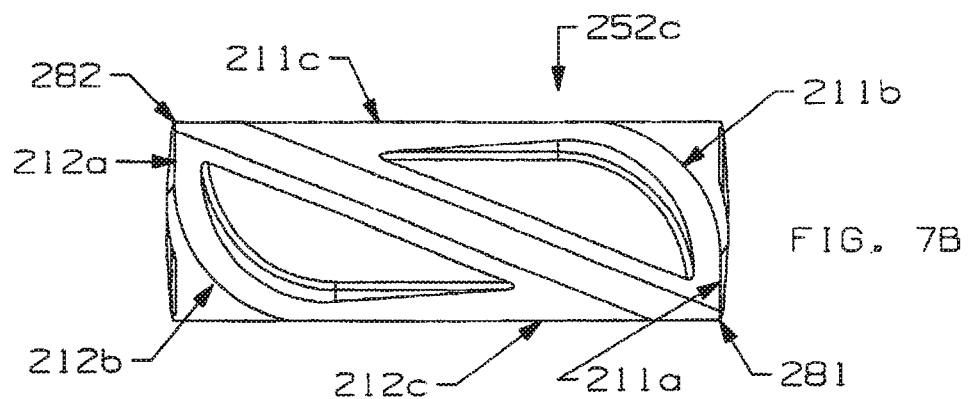
FIG. 7B is a projected view on the cutting rake surface of the double-sided tangential cutting insert of FIG. 6.
Figure 7C:
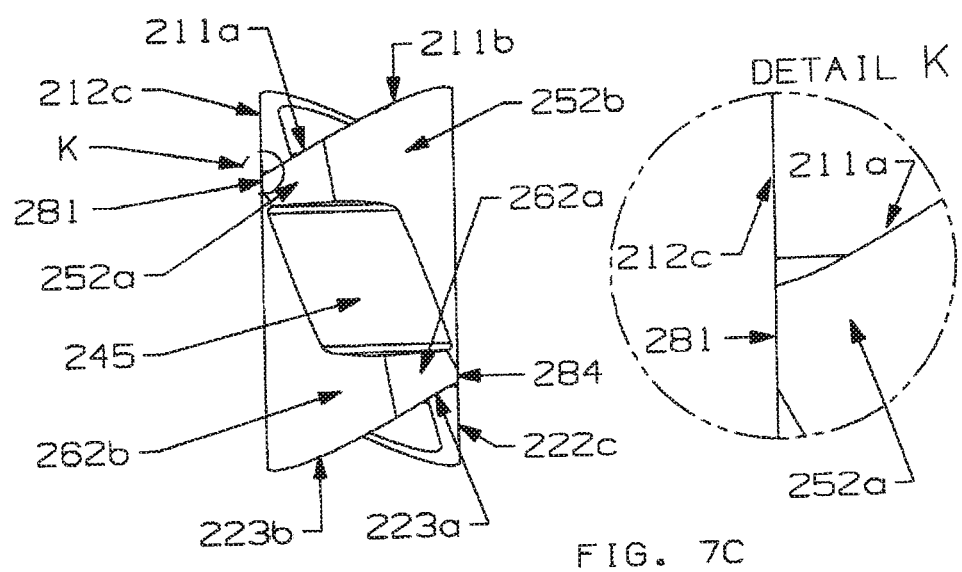
FIG. 7C is a projected view from the minor side surface on the right side together with a scaled detail view K of the double-sided tangential cutting insert of FIG. 6.

FIG. 6 and FIGS. 7A through 7C, illustrate a specific embodiment of a parallelogram double-sided tangential cutting insert 205. FIG. 6 is a three-dimensional perspective view. FIG. 7A is a projected view on the major side surface having a parallelogram shape. FIG. 7B is a projected view on the top cutting rake surface. FIG. 7C is a projected view on the minor side surface from the right side together with a scaled detail view K.

The double-sided tangential cutting insert 205 shown in FIG. 6 with a through fastener hole 206 has a top cutting rake surface 210 and an identical (or substantially identical) bottom cutting rake surface 220 (partially visible). The cutting rake surface 210 has a peripheral side shape comprising basically a pair of identical (or substantially identical) opposing substantially straight main cutting edges 211c and 212c, a pair of opposing full nose cutting edges 211b (radius R17) and 212b (radius R18) having a radius ranging from about 0.4 mm to about 8.0 mm, and a pair of opposing convex minor cutting edges 211a (radius R19) and 212a (radius R20). For each one of the convex minor cutting edges (221a, 212a), the radius R19 and R20 are about at least four times greater than the range of the corresponding full nose cutting edges 211b and 212b. In other words, R19 is at least about four times as great as R17, and R20 is at least about four times as great as R18. One of the two identical indexable cutting edges on the top cutting rake surface 210 comprises a convex minor cutting edge 211a having a large radius, a single full nose cutting edge 211b, a main cutting edge 211c truncated by the adjacent convex minor side face 232a. A full nose cutting edge is defined as the nose cutting edge being tangent to both adjacent cutting edges.

A sharp edge 282 and a point of truncation P1 at the top of the sharp edge 282 are formed as a result that the major cutting edge 211c is truncated by the adjacent convex minor side face 232a. Similarly, another indexable cutting edge on the top cutting rake surface 210 comprises a convex minor cutting edge 212a having a large radius (R20), a single full nose cutting edge 212b, a major cutting edge 212c truncated by the adjacent convex minor side face 252a (FIG. 7C). A sharp edge 281 and a point of truncation P1 at the top of the sharp edge 281 (or at the end of the main cutting edge 212c) are also formed as a result that the major cutting edge 212c is truncated by the adjacent convex minor side face 252a.

Referring to a median plane located between the top cutting rake surface 210 and the bottom cutting rake surface 220 and passing through the center line (CL in FIG. 6), the nose cutting edge 212b is farther away from the median plane than the point of truncation P1. Also, the nose cutting edge 211b is farther away from the median plane than the point of truncation P1.

In reality of cutting insert manufacturing like in a carbide pressing process, the so-called sharp edges 281 and 282 may actually be blended with a small radius (typically about 0.25 mm or smaller) which is much smaller than a regular nose radius (typically ranging from about 0.4 to about 8 mm).

Similar analysis or description may be carried out for the two indexable cutting edges (222a, 222b and 222c; and 223a, 223b and 223c) and the corresponding sharp edges 283 and 284 on the bottom cutting rake face 220 of the cutting insert 205 simply because the bottom cutting rake face 220 is identical to the top cutting rake face 210. The main cutting edge 212c on the top cutting rake face 210 is generally parallel to the cutting edge 223c on the bottom cutting rake face 220, thus referred as a parallelogram double-sided tangential cutting insert.

Further, the peripheral side surface of the cutting insert 205 extending from the cutting edges on the top cutting rake surface 210 towards the bottom cutting rake surface 220 comprises a pair of identical opposing planar major side faces 232c (FIG. 6 & FIG. 7A) and 252c (FIG. 7B) functioning as seating faces; a pair of opposing identical conical side faces 232b (FIG. 6 & FIG. 7A) and 252b (FIG. 7C); and a pair of opposing identical convex minor side faces 232a and 252a; while the peripheral side surface of the cutting insert 205 extending from the cutting edges on the bottom cutting rake surface 220 towards the top cutting rake surface 210 comprises a pair of same planar major side faces 232c and 252c; a pair of opposing identical conical side faces 242b and 262b; and a pair of opposing identical convex minor side faces 242a and 262a. Therefore, the planar major side faces 232c and 252c are extended all way from the top cutting rake surface 210 to the bottom cutting rake surface 220, however, each conical side 232b, 252b and each minor convex side face 232a, 252a on the top cutting rake face 210 are not extended to the bottom cutting rake face 220, and similarly each conical side face 242b, 262b and each convex minor side face 242a, 262a on the bottom cutting rake face 220 are not extended to the top cutting rake face 210.

The cutting insert 205 has a pair of identical, but distinct, peripheral support surfaces 236 and 237 on the top cutting rake face 210 wherein the faces 236 and 237 are co-planar, 180-degree symmetric about a center line (CL on FIG. 6) passing through the center of the cutting insert 205, and perpendicular to the faces 236 or 237. The double-sided tangential cutting insert 205 also has two identical axial support faces 235 and 245 wherein the convex minor side faces 232a, 242a, and the cylindrical faces 232b, 242b are truncated by the flat support face 235, and the convex minor side faces 252a, 262a, and the conical side faces 252b, 262b are truncated by the flat support face 245.

The double-sided tangential cutting insert 205 may have similar geometrical features as the double-sided tangential cutting inserts described in FIGS. 3, 3A, 4, 5A, 5B and 5C. For example, from FIG. 3, such features can derive from a cutting insert with each indexable cutting edge comprising a convex minor cutting edge having a large radius, a single full nose cutting edge, a main cutting edge, and a smaller and fixed partial nose cutting edge truncated by the adjacent convex minor side face. As another example, from FIG. 4, such features can derive from a tangential cutting insert with each indexable cutting edge comprising a convex minor cutting edge having a large radius, a single full nose cutting edge, a main cutting edge comprising a straight main cutting edge portion and a convex main cutting edge portion truncated by the adjacent convex minor side face. As yet another example, from FIGS. 5A, 5B, and 5C, such features can derive from a double-sided tangential cutting insert having two major side surfaces trimmed at the two ends adjacent to the main cutting edges.

Figure 8A:
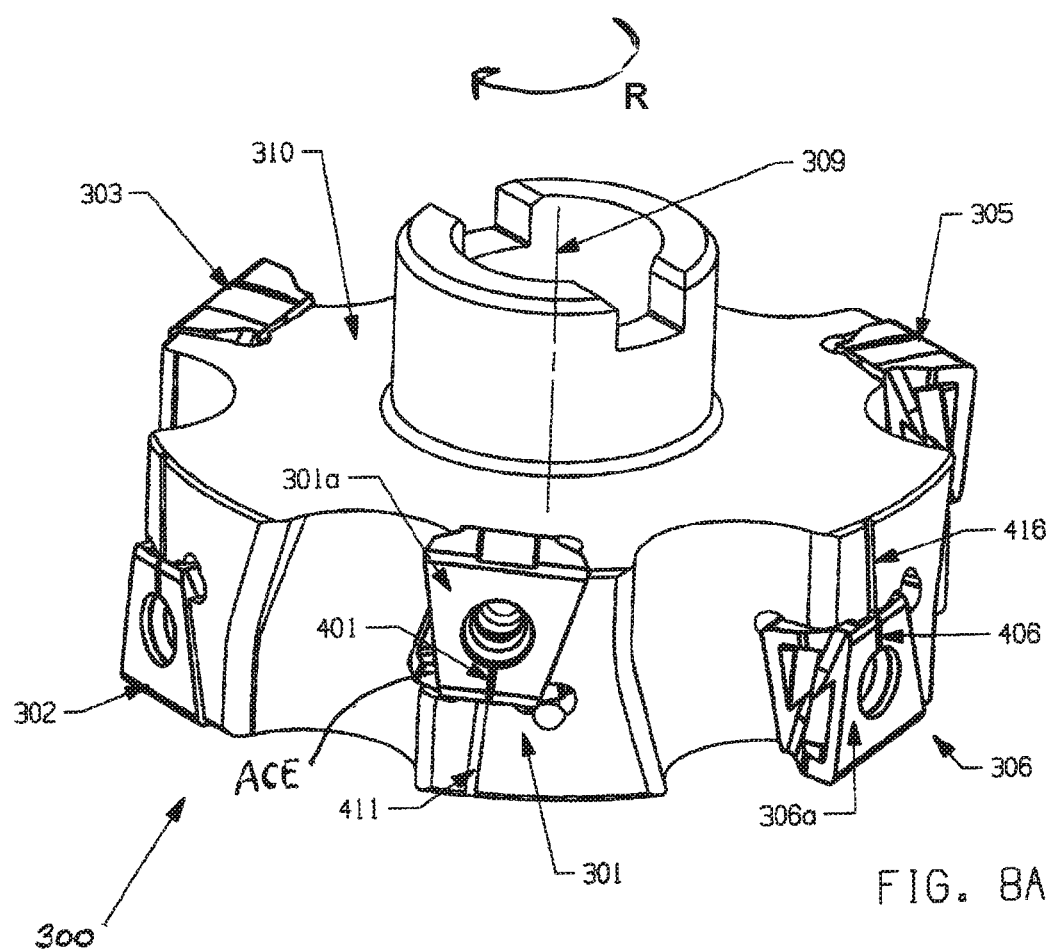
FIG. 8A shows a tangential cutting tool system comprising a tool holder that has at least an insert-receiving pocket and at least a trapezoidal double-sided tangential cutting insert according to present invention.
Figure 8B:
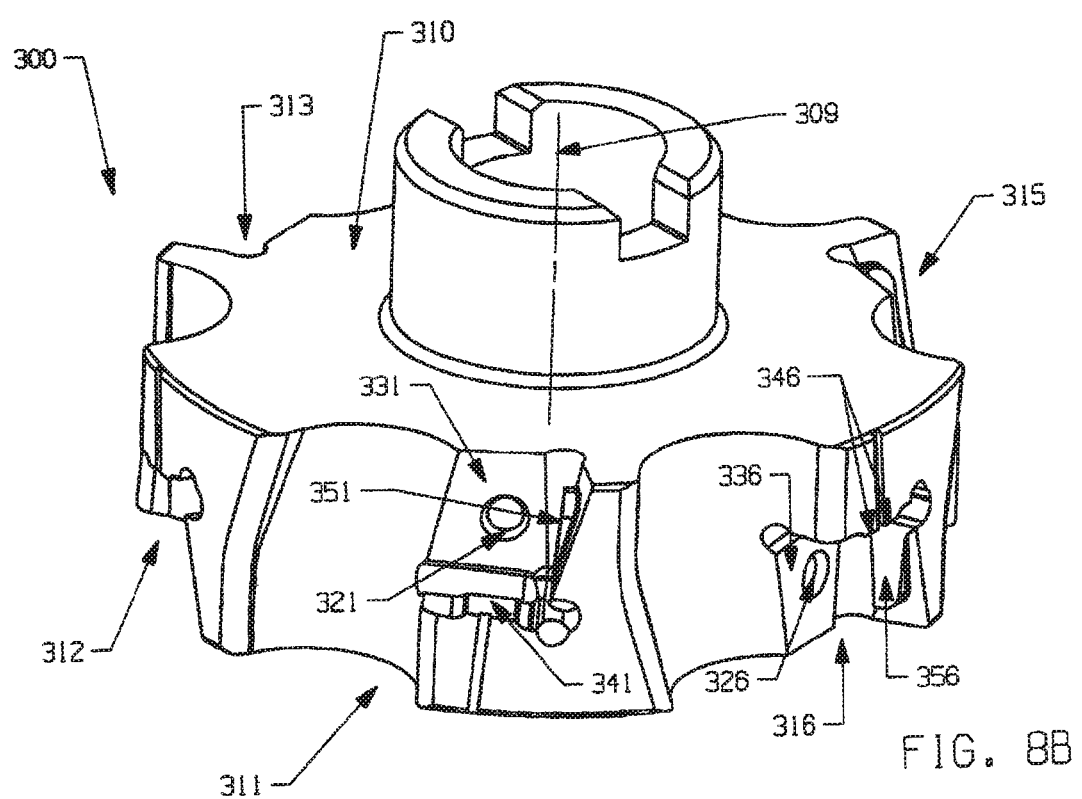
FIG. 8B shows a tangential cutting tool system comprising a tool holder that has at least an insert-receiving pocket.

FIGS. 8A and 8B show a tangential cutting tool system 300 comprising a tool holder 310; a plurality of insert-receiving pockets 311-316; and a plurality of trapezoidal double-sided tangential cutting insert 301-306 according to present invention. All the pockets 311-316 and all the tangential cutting inserts 301-306 are positional symmetric around the cutting axis 309 of the tool holder 310. The cutting insert is secured into a pocket 311 by a fastener (not shown) such as, for example, a threaded fastener like a screw, through a threaded hole 321 on the seating face 331. The direction of rotation of the tool holder 310 is designated by the arrow "R" in FIG. 8A. The active cutting edge of each double-sided tangential cutting insert is the radial outside cutting edge and is designated as ACE in FIG. 8A.

In an insert-receiving pocket 311 shown in FIG. 8B, the seating face 331; the axial pocket wall 341, and the peripheral pocket wall 351 are perpendicular to each other. Similarly, in an insert-receiving pocket 316 shown in FIG. 8B, the seating face 336; the axial pocket wall 346, and the peripheral pocket wall 356 are perpendicular to each other.

A major side surface from a double-sided tangential cutting insert, like the major side face 32c of cutting insert 5 in FIG. 1 or the major side face 82c of cutting insert 55 in FIG. 3 or the major side face 132c of cutting insert 105 in FIG. 4, or the major side face 182c of cutting insert 155 in FIGS. 5A-5C, will be abutted on the seating face 331 in the pocket 311 (or the seating face 336 in the pocket 316) in FIG. 8A (or FIG. 8B).

An axial support face from a double-sided tangential cutting insert, like the axial support face 35 of cutting insert 5 in FIG. 1 or the axial support face 85 of cutting insert 55 in FIG. 3 or the axial support face 135 of cutting insert 105 in FIG. 4 will be abutted against the axial pocket wall 341 in the pocket 311 (or the axial pocket wall 346 in the pocket 316) shown in FIG. 8.

A peripheral support face from a double-sided tangential cutting insert, like the peripheral support faces 36 and 37 of cutting insert 5 in FIG. 1 or the peripheral support faces 86 and 87 of cutting insert 55 in FIG. 3 or the peripheral support faces 136 and 137 of cutting insert 105 in FIG. 4 will be abutted against the peripheral pocket wall 351 in the pocket 311 (or the peripheral pocket wall 356 in the pocket 316) shown in FIG. 8.

Also, there is an alignment mark (or insert alignment indicator) 401 on the major side surface 301a of the cutting insert 301 (or an alignment mark 406 on the major side surface 306a of the cutting insert 306) which is aligned to a corresponding mark (or holder alignment indicator) 411 or a corresponding mark (or holder alignment indicator) 416 on the tool holder 310. This will prevent an operator from mistakenly positioning a double-sided tangential cutting insert 301-306 into a pocket 311-316, which would cause a damage to the cutting tool system.

Figure 9:
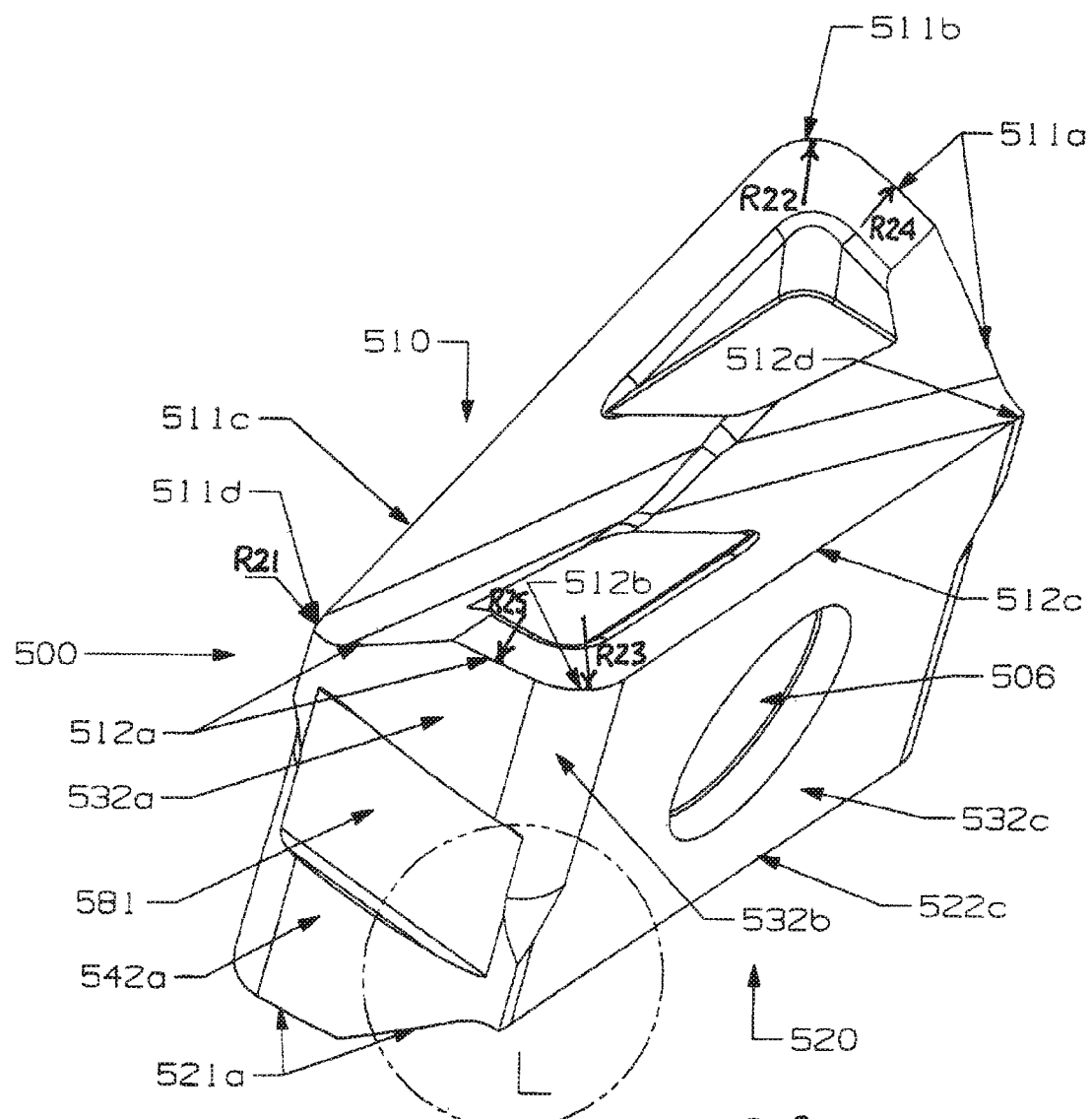
FIG. 9 is a three-dimensional perspective view that shows a specific embodiment of a parallelogram double-sided tangential cutting insert according to the present invention.

FIG. 9 shows a specific embodiment of a parallelogram double-sided tangential cutting insert 500 in a three-dimensional perspective view. The cutting insert 500 with a through fastener hole 506 has a top cutting rake surface 510 and an identical bottom cutting rake surface 520 (partially visible). A representative indexable cutting edge on the top cutting rake surface 510 comprises a convex minor cutting edge 511a having a large radius; a single full nose cutting edge 511b; a main cutting edge comprising a substantially straight main cutting edge portion 511c and a convex main cutting edge portion 511d. The convex main cutting edge portion 511d is tangent to the straight main cutting edge portion 511c at one end and truncated by the adjacent convex minor side face 532a at the other end. The function of the convex main cutting edge 511d is to eliminate the marks likely produced on the workpiece surface due to the deflection of a cutting tool system during the machining process. As seen from each indexable cutting edge in FIG. 9, for example, the single full nose cutting edge 511b is at a raised position while the convex main cutting edge portion 511d is at a lowered position with reference to the through hole 506. The convex main cutting edge portion 511d has a substantially large radius (as compared with a minor nose radius in a conventional tangential cutting insert), as a practical example shown in FIG. 9, R21=about 3 mm.

The identical full nose cutting edges 511b (radius R22) and 512b (radius R23) have a typical radius ranging from about 0.4 mm to about 8.0 mm, and the convex minor cutting edges 511a (radius R24) and 512a (radius R25) have a radius at least four (4) times more than the range of the corresponding full nose cutting edges 511b and 512b. In other words, R24 is at least about four times as great as R22, and R25 is at least about four times as great as R23. A full nose cutting edge is defined as that the nose cutting edge being tangent to both adjacent cutting edges. Thus, the full nose cutting edge 511b is tangent to both the straight main cutting edge portion 511c and the convex minor cutting edge 511a with a large radius, and similarly, the full nose cutting edge 512b is tangent to both the straight main cutting edge portion 512c and the convex minor cutting edge 512a with a large radius.

The double-sided tangential cutting insert 500 shown in FIG. 9 is usually referred as a parallelogram double-sided tangential cutting insert because the straight main cutting edge portion 512c at the top face 510 is parallel to the corresponding the straight main cutting edge portion 522c at the bottom face 520.

As shown in the detailed view Detail L (FIG. 9A), a bridging face 552 is constructed between the nose cylindrical (or conical) side face 532b and a sharp edge 562 formed by the intersection between the convex minor side face 542a and the convex major side face 542d extended from the convex main cutting edge portion 522d. Same as that of the convex main cutting edge portion 511d as above-described, the function of the convex main cutting edge portion 522d is to eliminate the marks likely produced on the workpiece surface due to the deflection of a cutting tool system during machining.

The convex major side face 542d is also truncated by the adjacent convex minor side face 542a. A sharp edge 562 is formed as a result that the convex major side face 542d is truncated by the adjacent convex minor side face 542a. In reality of cutting insert manufacturing for producing a fully-pressed carbide product, the sharp edge 562 may be blended with a small radius (typically about 0.25 mm or smaller) which is much smaller than a regular nose radius (ranging from about 0.4 to about 8 mm).

Figure 9B:
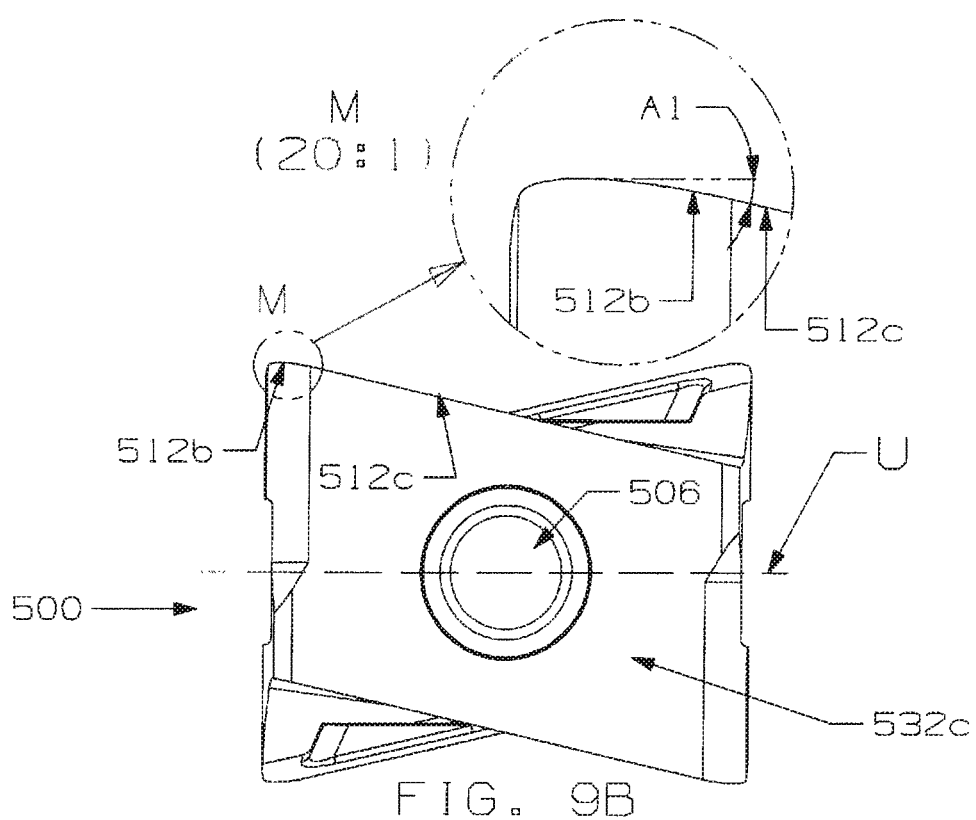
FIG. 9B is a projected view on the major side surface of the double-sided tangential cutting insert of FIG. 9 including enlarged view of the structure encompassed in a circle identified as "M"

Further, FIG. 9B demonstrates, as a representative embodiment, that the portion of the nose corner cutting edge 512b (of the cutting insert 500) at its end adjacent to a straight main cutting edge portion 512c, as viewed from a side of a major side surface 532c, forms an angle A1 (see Detail View M) with regard to a plane U passing through the center of the hole 506 and perpendicular to the major side surface 532c, wherein the angle A1 is larger than zero degrees, as shown in Detail View M. Note that the reference line used to define (in part) angle A1 is parallel to the plane U. Or in other words, the nose corner cutting edge 512b is substantially in alignment with the straight main cutting edge portion 512c, as viewed from a side (the adjacent one) of a major side surface 532c.

Figure 9C:
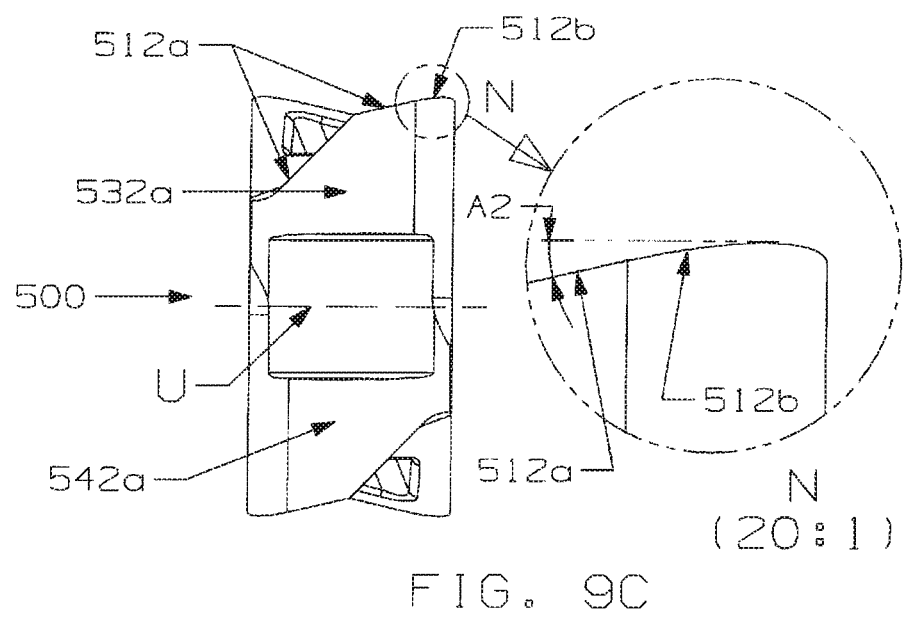
FIG. 9C is a projected view on the minor side surface of the double-sided tangential cutting insert of FIG. 9 including an enlarged view of the structure encompassed in a circle identified as "N"

And also FIG. 9C demonstrates, as a representative embodiment, that the portion of the nose corner cutting edge 512b at its end adjacent to a minor cutting edge 512a, as viewed from a side of a minor side surface 532a (or 542a), forms an angle A2 (see Detail View N) with regard to the plane U wherein the angle A2 is larger than zero degree as shown in Detail View N. Note that the reference line used to define (in part) angle A2 is parallel to the plane U. Or in other words, the nose corner cutting edge 512b is substantially in alignment with, or tangent to, an adjacent portion of the convex minor cutting edge 512a, as viewed from a side (the adjacent one) of a minor side surface 532a (or 542a).

Figure 10:
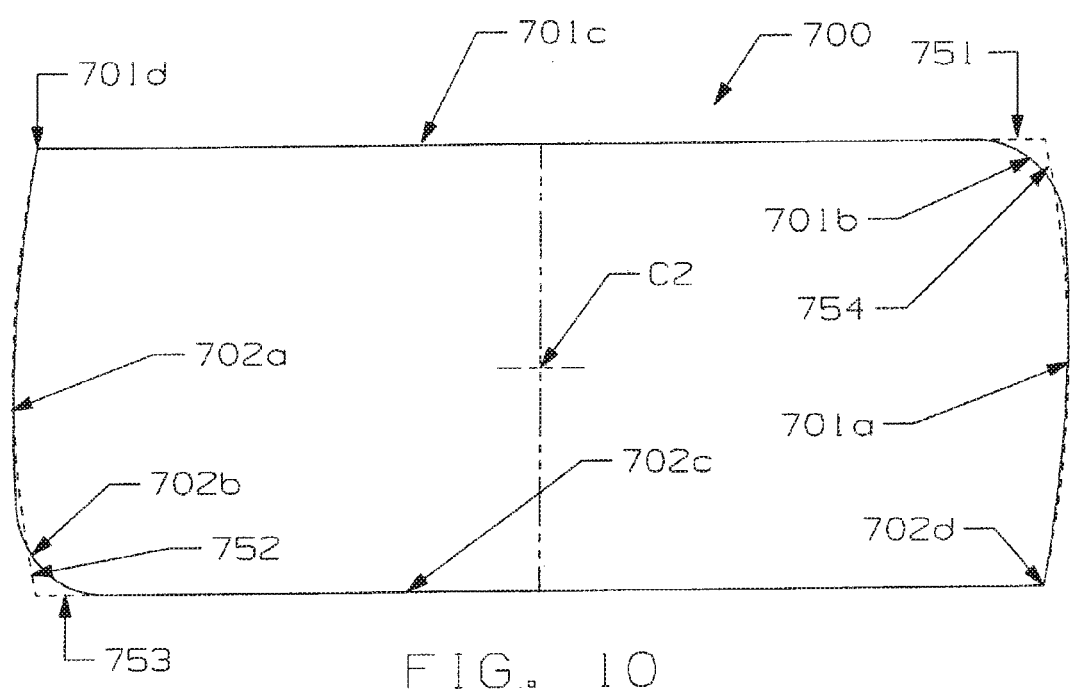
FIG. 10 is a view of a representative double-sided tangential cutting insert taken from the rake cutting face.

Referring to FIG. 10, the peripheral profiles as viewed from the chip rake faces of selected double-sided tangential cutting inserts, such as, for example, from the top cutting rake face 10 in FIG. 1B, from the top cutting rake face 60 in FIG. 3, from the top cutting rake face 110 in FIG. 4, and from the top cutting rake face 510 in FIG. 9, can be mathematically described as a sectioned barrel shape (two-dimensional) from a solid barrel shape (three-dimensional). FIG. 10 illustrates a generally barrel profile tangential cutting insert 700 (only periphery shown) as viewed from the chip rake face according to the present invention. A full cutting edge of the cutting insert 700 comprises a minor cutting edge 701a, a major nose corner 701b, a main cutting edge 701c (which can also comprise a straight main cutting edge portion and a convex main cutting edge portion like those shown and described in connection with the embodiment of FIG. 4 and the embodiment of FIG. 9) and a sharp point 701d (i.e. lack of a nosed corner). The cutting insert 700 is indexable by rotating 180 degrees around the center point C2 to have another full cutting edge comprising a minor cutting edge 702a, a major nose corner 702b, a main cutting edge 701c and a shape point 702d (i.e. lack of a nosed corner). The dotted straight lines 751 and 753, together with the dotted barreled (convex) curves 752 and 754, form a barrel like shape.

Figure 11A:
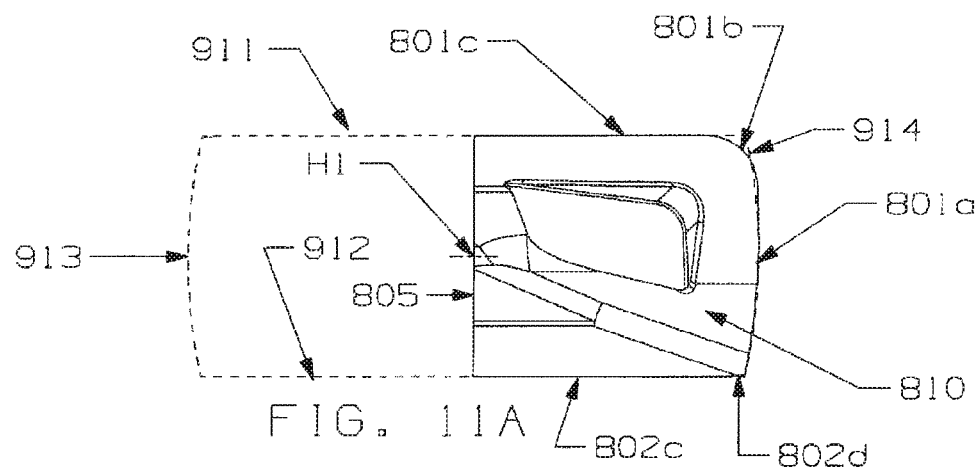
FIG. 11A is a side view taken from a cutting rake face and represents the right half portion of a complete double-sided tangential cutting insert.
Figure 11B:
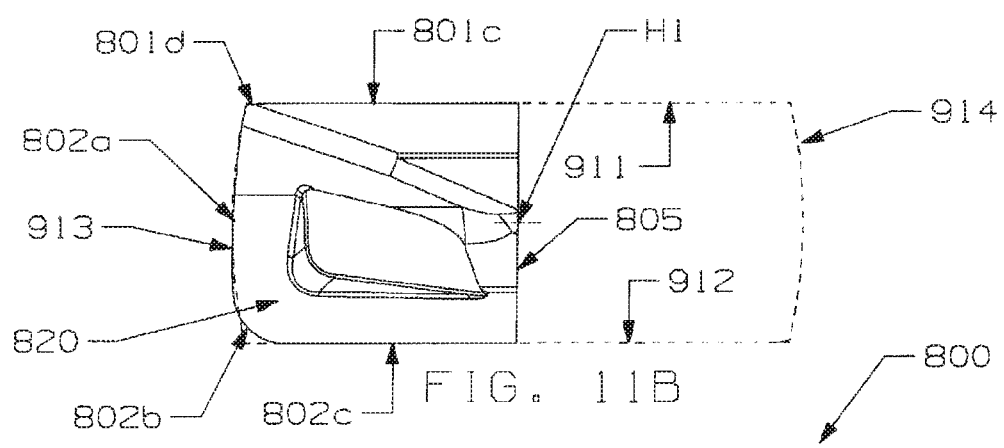
FIG. 11B is a side view taken from a cutting rake face and represents the left half portion of a complete double-sided tangential cutting insert.
Figure 11C:
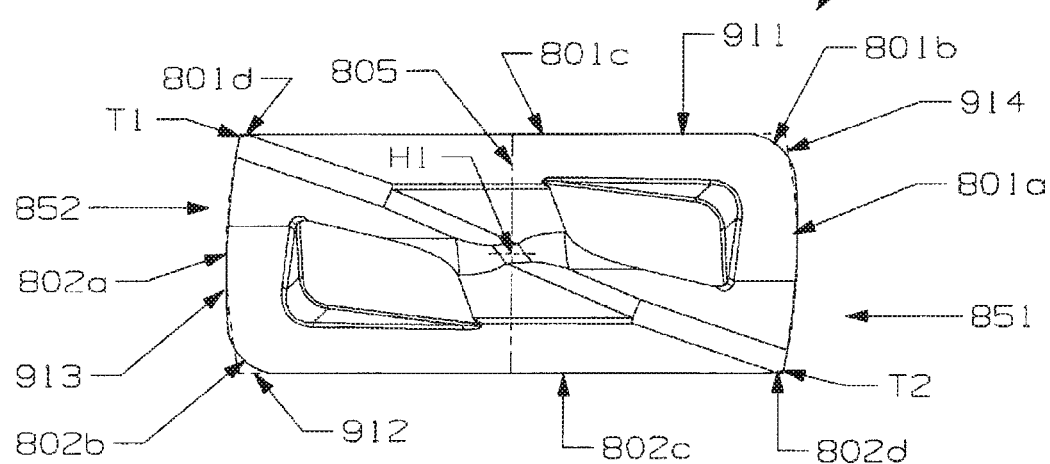
FIG. 11C is a side view taken from a cutting rake face of the right hand portion of FIG. 11A and the left hand portion of FIG. 11B to show the complete cutting rake face of the double-sided tangential cutting insert.

Referring to FIGS. 11A, 11B and 11C, these drawings illustrate the structure of the cutting insert at the various stages of a step-by-step design procedure (or process or method) to create a solid model of an inventive barrel shaped double-sided tangential cutting insert according to this invention disclosure. FIG. 11A is a side view from a cutting rake face (just like the cutting rake face 510 in FIG. 9) representing a right half portion 810 (as viewed in FIG. 11A) of a complete double-sided tangential cutting insert 800 (see FIG. 11C). As a first step in the procedure, there is the boundary of the right half portion 810 which includes a convex minor cutting edge 801a having a large radius, a full nose radius corner cutting edge 801b and a part of the first straight main cutting edge portion 801c, a vertical center line 805 (at half), a part of the second straight main cutting edge portion 802c and an adjoining convex main cutting edge portion 802d. The right half portion 810 is constructed in a generally barrel shape as demonstrated by a comparison to a standard barrel section (two dimensional) consisting of, which are shown by the broken lines, the top straight line 911, the left curve 913, the bottom straight line 912 and the right curve 914. One major difference between the right half portion 810 of the cutting insert 800 and the standard barrel profile in broken lines is the rounded nose corner 801b due to the essential requirement in reality machining operations.

FIG. 11B is a side view from a cutting rake face resulting from rotating the right half portion 810 about the center point H1 for 180 degrees to create the left half portion 820 (as viewed in FIG. 11B) of a complete double-sided tangential cutting insert 800 (see FIG. 11C). As the second step in the procedure, there is the boundary of the left half portion 820 which includes a convex minor cutting edge 802a having a large radius, a full nose radius corner cutting edge 802b and a part of the second straight main cutting edge portion 802c, a vertical center line 805 (at half), a part of the first straight main cutting edge portion 801c and an adjoining convex main cutting edge portion 801d. In other words, the left half portion 820 is 180 degree rotational symmetric to the right half portion 810 about the center point H1. Along the lines of the description in conjunction with FIG. 11A, FIG. 11B shows a standard barrel section (two dimensional) consisting of (shown by broken lines) the top straight line 911, the left curve 913, the bottom straight line 912 and the right curve 914.

Referring to FIG. 11C, FIG. 11C is a side view from a cutting rake face that shows the last step in the procedure which is the uniting of the right half portion 810 with the left half portion 820 to create a complete double-sided tangential cutting insert 800 which has a general barrel profile as viewed normally from a cutting rake face. More specifically, FIG. 11C shows the uniting that forms the first complete cutting edge of a double-sided tangential cutting insert 800 comprises a convex minor cutting edge 801a having a large radius, a single full nose radius corner cutting edge 801b, a straight main cutting edge portion 801c, and a convex main cutting edge portion 801d truncated by a convex minor side face 852 thus correspondently creating a shape point of truncation T1. Similarly, FIG. 11C shows the formation of the second complete cutting edge of a double-sided tangential cutting insert 800 that comprises a convex minor cutting edge 802a having a large radius, a single full nose radius corner cutting edge 802b, a straight main cutting edge portion 802c, and a convex main cutting edge portion 802d truncated by a convex minor side face 851 thus correspondently creating a shape point of truncation T2. Along the lines of the description in conjunction with FIG. 11A and FIG. 11B, FIG. 11C shows a standard barrel section (two dimensional) consisting of (shown by broken lines) the top straight line 911, the left curve 913, the bottom straight line 912 and the right curve 914.

Therefore we define that a double-sided tangential cutting insert according to present invention is a generally barrel profile (or shape) as viewed from a cutting rake face. We also define that the right half portion and the left portion are 180 degree rotational symmetric about the center point of the subject cutting insert, as viewed from a cutting rake face. The generally barrel shape as viewed from a cutting rake face is applied to both a double-sided tangential cutting insert having a parallelogram shape as viewed from a major side surface, and a double-sided tangential cutting insert having a trapezoidal shape as viewed from a major side surface.

The advantage of having a generally barrel profile as viewed from a cutting rake face is the barrel shaped minor cutting edge (or the convex minor cutting edge with a large radius) can easily adapt to the various undesired machining conditions such as, for example, tool holder deflections during machining and tolerance variations from product manufacturing while still effectively produce good surface finish on the machined workpiece surface.

Certain non-limiting embodiments according to the present disclosure include a double-sided tangential cutting insert having a peripheral shape, as viewed from the cutting rake face (or called end surface), comprising a pair of identical opposing main cutting edges, a pair of opposing full nose cutting edges having a radius ranging from about 0.4 mm to about 8.0 mm, and a pair of opposing convex minor cutting edges having a radius at least about four (4) times more than the range of the full nose cutting edges (defined as the nose cutting edge tangent to both adjacent cutting edges), wherein the main cutting edge is truncated by an adjacent convex minor side face; and wherein the main cutting edge may be in a form of a substantially straight cutting edge truncated by an adjacent convex minor side face; or in a combined form of a portion of a substantially straight cutting edge and a portion of a convex cutting edge truncated by an adjacent convex minor side face; or in a form of a portion of a substantially straight cutting edge and a portion of a partial nose edge having a small and fixed radius truncated by an adjacent convex minor side face.

Figure 12:
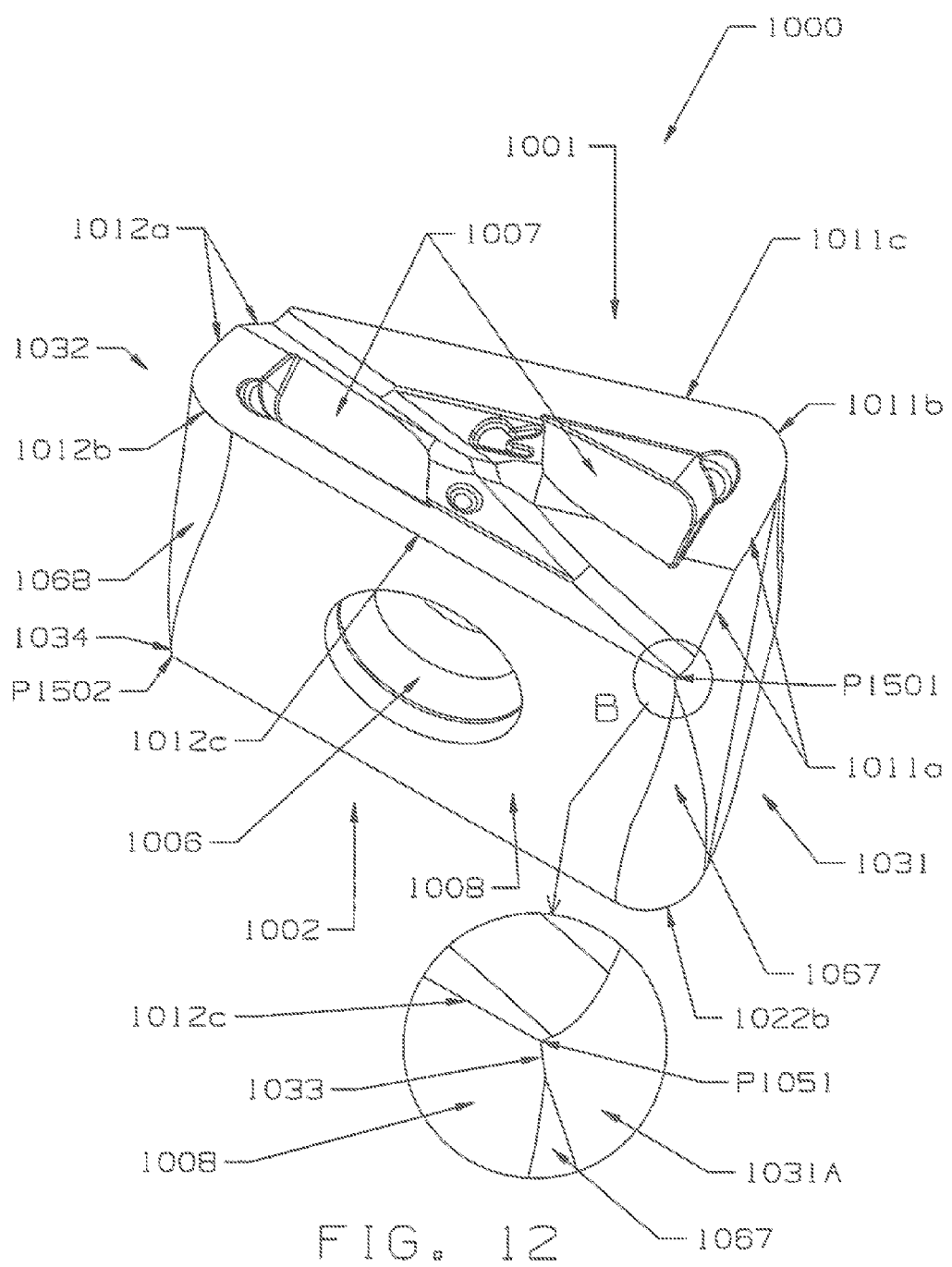
FIG. 12 provides an isometric view of a variant double-sided tangential cutting insert.

In accordance with at least one variant embodiment, FIG. 12 illustrates a double-sided tangential cutting insert 1000 having two indexable cutting edges disposed on identical top and bottom cutting rake surfaces 1001 and 1002 alike, a front major side face 1008 and (as referenced in FIG. 14) an identical back major side face 1009, two identical minor side faces 1031 and 1032, a central screw hole 1006 through the major side faces 1008 and 1009, and a pair of coplanar surfaces 1007 functioning as a peripheral support for the seating of the cutting insert in an insert-receiving pocket.

As also shown, a first top cutting edge (overall) comprises a convex minor cutting edge 1012a having a large radius, a single full nose cutting edge 1012b, and a main cutting edge 1012c terminating at an adjacent twisted convex minor side face 1031A (itself, a portion of the minor side face 1031). Similarly, an identical second top cutting edge (overall) includes a convex minor cutting edge 1011a having a large radius, a single full nose cutting edge 1011b, and a main cutting edge 1011c terminating at an adjacent twisted convex minor side face 1032. Further, each convex minor cutting edge 1011a/1012a may include multiple segments each having different radii; in the illustrated working example, each of the convex minor cutting edges 1011a and 1012a has two segments.

A conical convex surface 1068 can be formed, from the full nose cutting edge 1012b at the top cutting rake surface 1001 to an upper terminal point of a small, substantially straight edge 1034. For its part, edge 1034 begins a short distance away from the bottom cutting rake surface 1002, and terminates at the sharp corner point P1502. Similarly, a conical convex surface 1067 can also be formed, from the full nose cutting edge 1022b at the bottom cutting rake surface 1002 to a lower upper terminal point of another small, substantially straight edge 1033; analogously to edge 1034, the edge 1033 begins a short distance away from the bottom cutting rake surface 1001 and terminates at the sharp corner point P1501.

Sharp points such as P1051/P1052, as well as sharp (substantially straight) edges such as 1033/1034, can provide advantages as compared to full minor nose cutting edges that otherwise may be located there. For instance, a maximum cutting length is increased, while a consistent cutting length is provided for different radii of full nose cutting edges (such as those shown at 1011b/1012b). These advantages can be particularly useful for indexable slot milling cutters.

Figure 13:
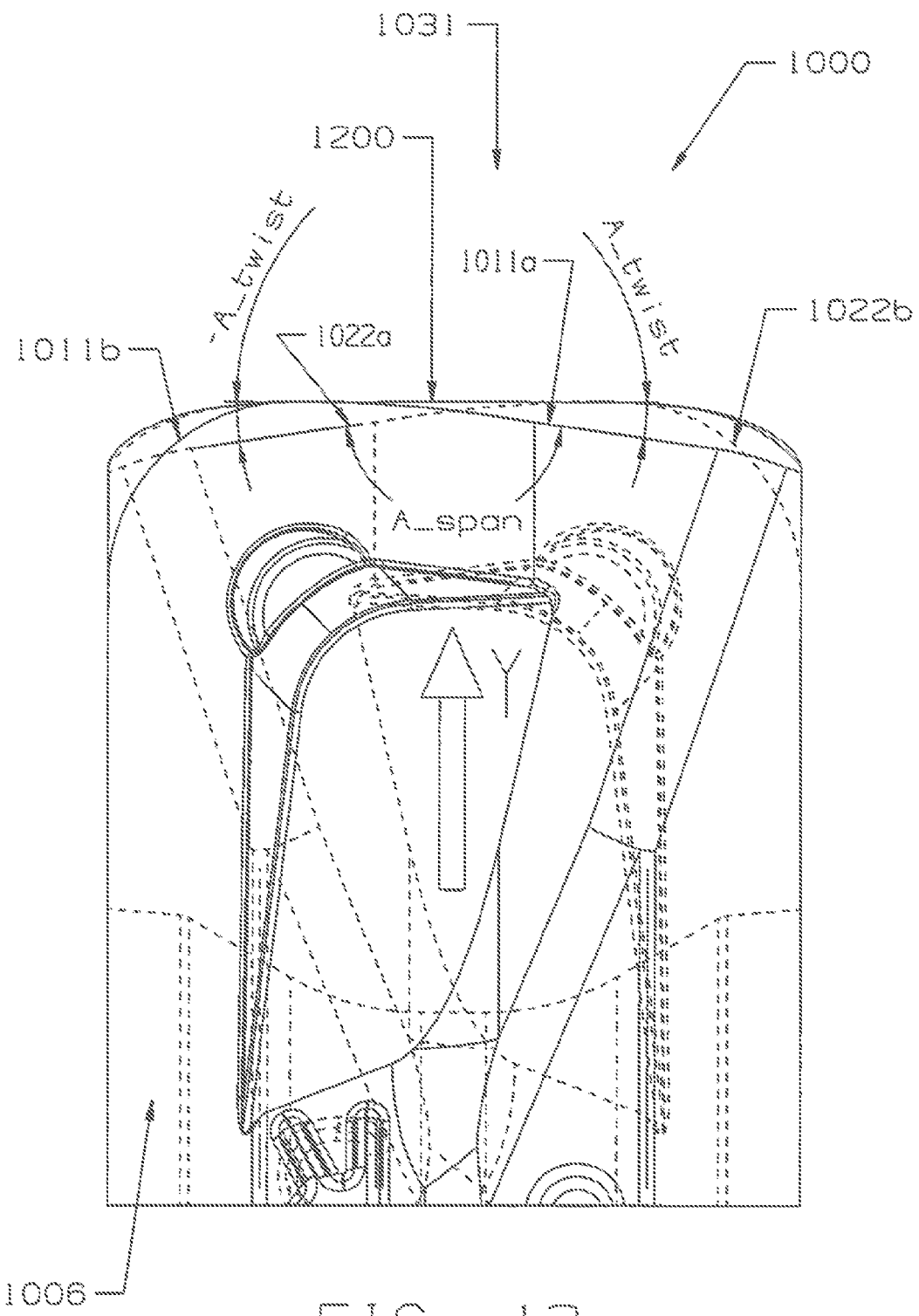
FIG. 13 is a projected half-view on a top cutting rake surface of the double-sided tangential cutting insert of FIG. 12.

FIG. 13 is a projected half-view on the top cutting rake face 1001, focusing on the full nose cutting edge 1011b and the convex minor cutting edge 1011a on the top cutting rake face 1001. Also shown, via dotted lines, are the full nose cutting edge 1022b and the convex minor cutting edge 1022a of the bottom cutting rake face 1002. These elements contribute in forming the twisted convex shape of minor side face 1031. As broadly contemplated and referenced herein, a "twisted convex" shape, face or surface can be understood as including or involving a surface that protrudes outwardly from a cutting insert (i.e., in a direction generally away from a center point or central axis of the insert) and includes a property of outward protrusion varying distances, so as to appear "twisted", away from an imaginary plane defined at a side of the insert. Further details may be appreciated from the present illustrative working example.

As shown, the top convex minor cutting edge 1011a and the bottom convex minor cutting edge 1022a define therebetween a span angle, A_span, which is less than 180°. In other words, the top convex minor cutting edge 1011a and the bottom convex minor cutting edge 1022a are skewed with respect to one another. As such, in progressing along a "vertical" or "Z-axis" direction of the minor side face 1031 between convex minor cutting edge 1011a and bottom convex minor cutting edge 1022a (i.e., in a direction perceptually into or out of the drawing), the outer surface of minor side face 1031 undergoes a transition in its orientation with respect to the illustrated Y-axis, from the illustrated orientation of edge 1011a to that of edge 1022a and thus "twists" with respect to the "vertical" direction or "Z-axis".

In this respect, the top convex minor cutting edge 1011a defines a positive twist angle, A_twist, about a line 1200 (which appears horizontal in the view of FIG. 13), while the bottom convex minor cutting edge 1022a forms a negative twist angle, −A_twist, about the line 1200. For its part, the line 1200 represents an outwardmost point of protrusion (or apex) with respect to the illustrated Y-axis over the a given "vertical" extent of the minor side face 1031, and extends from the outwardmost point (apex) along the cutting edges 1011b/1011a and the outwardmost point (apex) along the cutting edges 1022b/1022a (both with reference to the Y axis). Essentially, line 1200 represents a straight "ridge" protruding outwardly from a convex arcuate surface. Essentially, a wide variety of values for A_span and A_twist are conceivable; by way of an illustrative and non-restrictive example, A_span=163.5° and A_twist=8.2°.

As generally known, when the arcuate surface of a cutting insert seats against a pocket wall in an insert-receiving pocket, the cutting insert may have a tendency to rotate or move away from its original mating position in the contact interface during a machining process. The less contact there is in the interface between the arcuate face and the pocket wall, the greater this tendency of rotating or moving. However, in accordance with at least one embodiment as broadly contemplated herein, it is recognized that in a double-sided tangential cutting insert, contact involving a non-horizontal or a non-vertical line in a mating interface may reduce the aforementioned tendency of rotating or moving.

Figure 14:
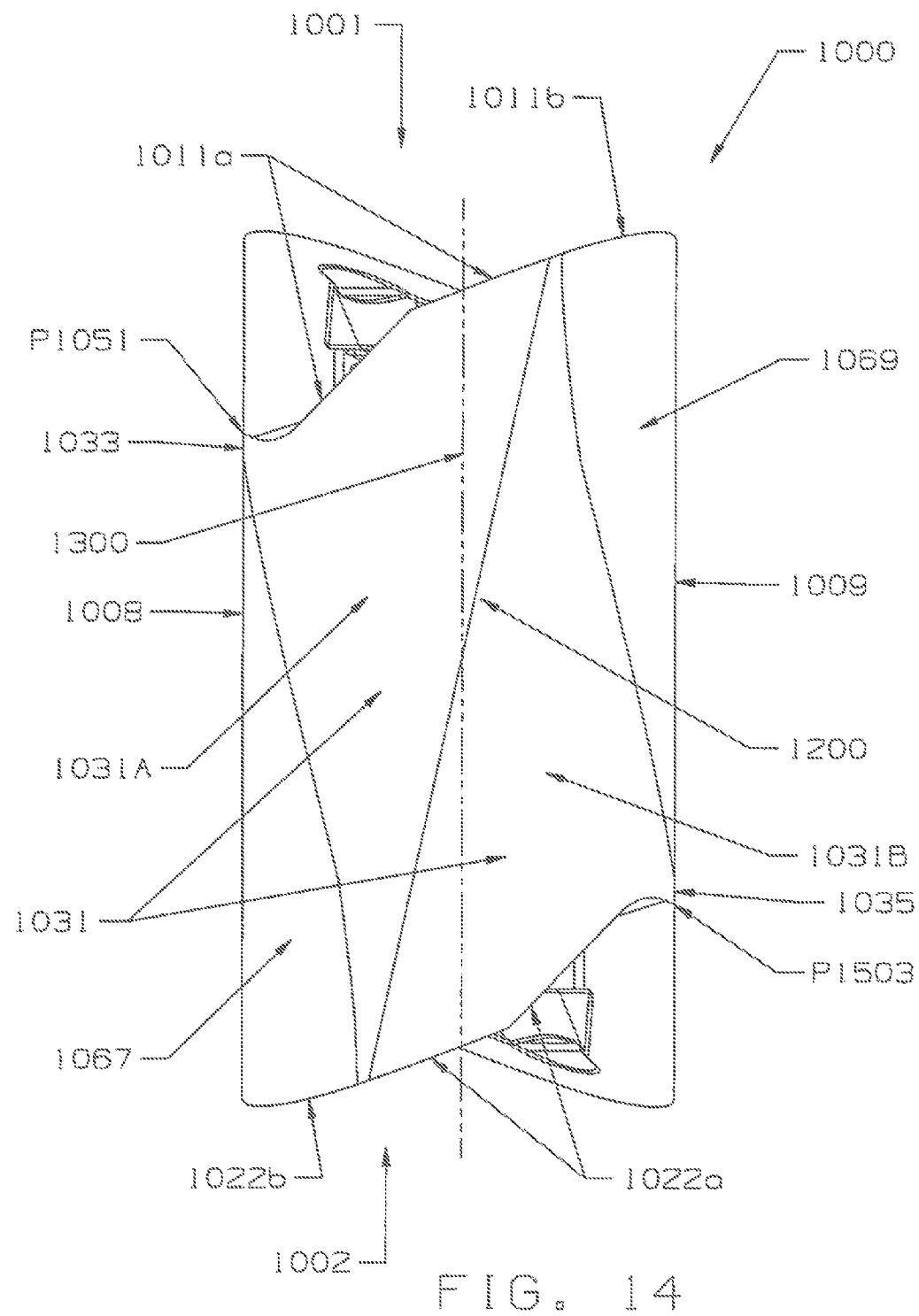
FIG. 14 is a projected view on a minor side surface of the double-sided tangential cutting insert of FIG. 12, showing a twisted convex minor side surface.

A twisted convex minor side face 1031, as broadly contemplated herein, is shown in FIG. 14. As shown, the twisted convex minor side face 1031 includes a portion 1031A and a portion 1031B. In the present illustrative working example, portion 1031A and the portion 1031B are 180° rotationally symmetric about a middle point of line 1200. Thus, when double-sided tangential cutting insert 1000 is seated in a corresponding pocket, the twisted convex minor side face 1031 is disposed against the pocket wall via the contact line 1200. At the same time, dotted line 1300 represents a line of contact for a conventional cutting insert in a pocket. As compared to "conventional" contact line 1300, the line 1200 is longer and formed diagonally on the convex minor side face 1031 (when viewed from a head-on perspective such as that in FIG. 14), therefore the cutting insert 1000 will have less of a tendency of rotating or moving in a corresponding pocket on a tool holder, and will be established in a more secure mating position while seated therein.

FIG. 14 also illustrates geometric features, from a projective view on the twisted convex minor side face 1031, including a conical convex surface 1069 formed from a full nose cutting edge 1011b at the top cutting rake surface 1001 to an upper terminal point of a small, substantially straight edge 1035. Edge 1035 begins a short distance away from the bottom cutting rake surface 1002, and terminates at the sharp corner point P1503. Also shown here is the conical convex surface 1067 previously described. Thus, it can be appreciated that each of four similarly configured conical convex surfaces (of which 1067, 1068 and 1069 are visible in the figures and described herein) is developed from a full nose cutting edge (e.g. 1011b) at one of the cutting rake surfaces (e.g. 1001) towards one of the opposing cutting rake surfaces (e.g. 1002), and ends at a substantially straight edge (e.g. 1035) which is further extended to a sharp point (e.g. P1053).

Certain non-limiting embodiments according to the present disclosure include a double-sided tangential cutting insert having a generally barrel-like peripheral shape, as viewed from a top or bottom cutting rake face, comprising a pair of identical opposing main cutting edges, a pair of opposing full nose cutting edges having a radius ranging from about 0.4 mm to about 6.0 mm, and a pair of opposing convex minor cutting edges. In such non-limiting embodiments, the main cutting edge is truncated by an adjacent twisted convex minor side face, the radius of the convex minor cutting edge is at least three times greater than the nose cutting radius, and the top convex minor cutting edge and the bottom convex minor cutting edge form a twisted convex minor side face resulting a diagonal straight line enabling a secured mating position for the cutting insert in a pocket. Additionally, in such non-limiting embodiments, a conical convex surface formed from a full nose cutting edge at a top cutting rake surface downward to a substantially straight edge which is further extended to a sharp point, or similarly a conical convex surface formed from a full nose cutting edge at a bottom cutting rake surface upward to a substantially straight edge which is further extended to a sharp point.

Furthermore, in certain non-limiting embodiments, each indexable cutting edge comprises a convex minor cutting edge, a single full nose cutting edge and a substantially straight main cutting edge truncated by an adjacent twisted convex minor side face.

Each of the patents and other documents identified herein are hereby incorporated in their entirety by reference herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A double-sided tangential cutting insert comprising:
   a pair of opposing cutting rake faces;
   a pair of opposing major side surfaces;
   a pair of opposing minor side faces, each having a twisted convex shape; and
   each of the cutting rake faces being defined between:
      a pair of opposing main cutting edges;
      a pair of opposing full nose cutting edges each having a full nose cutting radius; and
      a pair of opposing convex minor cutting edges each having a minor cutting edge radius, wherein the minor cutting edge radius is at least three times greater than the full nose cutting radius;
   each of the minor side faces being defined between one of the convex minor cutting edges at one of the rake faces and one of the convex minor cutting edges at the other one of the rake faces;
   wherein, at each of the minor side faces, a ridge line interconnects an apex of the convex minor edge at the one of the rake faces and an apex of the convex minor cutting edge at the other one of the rake faces.

2. The double-sided tangential cutting insert of claim 1, wherein:
   each of the opposing full nose cutting edges has a full nose cutting radius; and
   each of the opposing convex minor cutting edges has a minor cutting edge radius, wherein the minor cutting edge radius is at least three times greater than the full nose cutting radius.

3. The double-sided tangential cutting insert of claim 1, wherein:
   the cutting rake faces are substantially identical to one another;
   the major side surfaces are substantially identical to one another;

the minor side faces are substantially identical to one another; and the main cutting edges are substantially identical to one another.

4. The double-sided tangential cutting insert of claim 1 wherein, at each of the minor side faces, the ridge line comprises an outwardmost protrusion of the minor side face along a given extent of the minor side face.

5. The double-sided tangential cutting insert of claim 1, wherein, with respect to a planar end view of each of the minor side faces, the ridge line comprises a straight diagonal line interconnecting the apex of the convex minor edge at the one of the rake faces and the apex of the convex minor cutting edge at the other one of the rake faces.

6. The double-sided tangential cutting insert of claim 1, wherein each of the main cutting edges comprises a substantially straight main cutting edge terminating at an adjacent one of the minor side faces, and defining a sharp corner point at the point of termination.

7. The double-sided tangential cutting insert of claim 1, comprising:
four indexable cutting edges;
each of the four indexable cutting edges comprising:
one of the convex minor cutting edges;
one of the single full nose cutting edges, adjoining the one of the convex minor cutting edges; and
one of the main cutting edges, adjoining the one of the single full nose cutting edges.

8. The double-sided tangential cutting insert of claim 1, further comprising:
four conical convex surfaces;
each conical convex surface extending from one of the full nose cutting edges, at one of the cutting rake surfaces, toward the other one of the cutting rake surfaces;
each conical convex surface ending at a point.

9. The double-sided tangential cutting insert of claim 8, wherein:
the point comprises a terminal point of a substantially straight edge;
wherein each substantially straight edge extends from the terminal point to a sharp corner point.

10. The double-sided tangential cutting insert of claim 1, wherein:
each of the cutting rake faces further includes a pair of substantially identical peripheral support surfaces;
wherein the peripheral support surfaces are generally co-planar with respect to each other and are generally perpendicular with respect to one or more of the major side faces.

11. A tangential cutting tool system, comprising:
a cutting tool holder comprising a plurality of insert-receiving pockets, wherein each pocket comprises a seating face, an axial pocket wall, and a peripheral pocket wall;
a plurality of double-sided tangential cutting inserts being secured into said insert-receiving pockets, wherein each double-sided tangential cutting insert comprises:
a pair of opposing cutting rake faces;
a pair of opposing major side surfaces;
a pair of opposing minor side faces, each having a twisted convex shape; and
each of the cutting rake faces being defined between:
a pair of opposing main cutting edges;
a pair of opposing full nose cutting edges each having a full nose cutting radius; and
a pair of opposing convex minor cutting edges each having a minor cutting edge radius, wherein the minor cutting edge radius is at least three times greater than the full nose cutting radius;
each of the minor side faces being defined between one of the convex minor cutting edges at one of the rake faces and one of the convex minor cutting edges at the other one of the rake faces;
wherein, at each of the minor side faces, a ridge line interconnects an apex of the convex minor edge at the one of the rake faces and an apex of the convex minor cutting edge at the other one of the rake faces.

12. The system of claim 11, wherein the seating face, the axial pocket wall and the peripheral pocket wall are perpendicular to one other.

13. The system of claim 11, wherein:
each of the opposing full nose cutting edges has a full nose cutting radius; and
each of the opposing convex minor cutting edges has a minor cutting edge radius, wherein the minor cutting edge radius is at least three times greater than the full nose cutting radius.

14. The system of claim 1 wherein, at each of the minor side faces, the ridge line comprises an outwardmost protrusion of the minor side face along a given extent of the minor side face.

15. The system of claim 1, wherein, with respect to a planar end view of each of the minor side faces, the ridge line comprises a straight diagonal line interconnecting the apex of the convex minor edge at the one of the rake faces and the apex of the convex minor cutting edge at the other one of the rake faces.

16. The system of claim 1, wherein each of the main cutting edges comprises a substantially straight main cutting edge terminating at an adjacent one of the minor side faces, and defining a sharp corner point at the point of termination.

17. The system of claim 1, wherein each of the double-sided tangential cutting inserts comprises:
four conical convex surfaces;
each conical convex surface extending from one of the full nose cutting edges, at one of the cutting rake surfaces, toward the other one of the cutting rake surfaces;
each conical convex surface ending at a point.

18. The system of claim 17, wherein:
the point comprises a terminal point of a substantially straight edge;
wherein each substantially straight edge extends from the terminal point to a sharp corner point.

19. The system of claim 1, wherein:
each of the cutting rake faces further includes a pair of substantially identical peripheral support surfaces;
wherein the peripheral support surfaces are generally co-planar with respect to each other and are generally perpendicular with respect to one or more of the major side faces.

* * * * *